United States Patent
Warhurst

(10) Patent No.: US 7,811,044 B2
(45) Date of Patent: Oct. 12, 2010

(54) APPARATUS FOR LIFTING, HANDLING AND TRANSPORTING A CONTAINER

(75) Inventor: Peter S. Warhurst, Belleair, FL (US)

(73) Assignee: Pods Enterprises, Inc., Clearwater, FL (US)

( * ) Notice: Subject to any disclaimer, the term of this patent is extended or adjusted under 35 U.S.C. 154(b) by 1126 days.

(21) Appl. No.: 11/400,098

(22) Filed: Apr. 7, 2006

(65) Prior Publication Data
US 2006/0285959 A1 Dec. 21, 2006

Related U.S. Application Data

(60) Provisional application No. 60/672,622, filed on Apr. 18, 2005.

(51) Int. Cl.
*B60P 1/64* (2006.01)
(52) U.S. Cl. ........................ 414/458; 414/498
(58) Field of Classification Search .............. 414/498, 414/458, 545, 540, 576, 347, 392, 459; 14/31, 14/37
See application file for complete search history.

(56) References Cited

U.S. PATENT DOCUMENTS

| | | | | |
|---|---|---|---|---|
| 2,197,375 A | * | 4/1940 | Dafnis | 104/48 |
| 2,703,659 A | | 3/1955 | Hutchins | 414/498 |
| 2,937,879 A | * | 5/1960 | Lion | 280/43.21 |
| 3,135,407 A | | 6/1964 | Back | 414/498 |
| 3,243,193 A | * | 3/1966 | Bivins et al. | 280/35 |
| 3,305,116 A | * | 2/1967 | McKee | 414/459 |
| 3,348,711 A | * | 10/1967 | Gove | 414/459 |
| 3,541,598 A | * | 11/1970 | Dousset | 414/459 |
| 3,628,826 A | * | 12/1971 | Sibley | 296/98 |
| 3,669,290 A | * | 6/1972 | Doyle | 414/459 |
| 3,744,652 A | | 7/1973 | Rieschel | 414/459 |
| 3,749,363 A | | 7/1973 | Hauser | |
| 3,794,196 A | * | 2/1974 | Terho et al. | 414/458 |
| 3,881,689 A | * | 5/1975 | Bury et al. | 254/45 |
| 4,297,068 A | * | 10/1981 | Concha et al. | 414/458 |
| 4,491,452 A | | 1/1985 | Matovich | 414/458 |
| 4,522,550 A | | 6/1985 | Whitehouse | 414/498 |
| 4,551,059 A | * | 11/1985 | Petoia | 414/459 |
| 4,599,030 A | * | 7/1986 | Skaalen et al. | 414/460 |

(Continued)

FOREIGN PATENT DOCUMENTS

AU 199890559 B2 9/1998

(Continued)

OTHER PUBLICATIONS

PCT Search Report.

*Primary Examiner*—James Keenan
(74) *Attorney, Agent, or Firm*—Stroock & Stroock & Lavan LLP

(57) ABSTRACT

A mobile carrier frame is used for lifting, handling, and transporting containers on to and off of the platform of a transport vehicle, such as a truck. Drive wheels and caster wheels are positioned such that the carrier frame may be more easily maneuvered into tight spaces, such as parallel parking spaces. The carrier frame may be remotely operated by means of a remote control device. A transverse element at the rear end of the carrier frame may be used to provide additional structural support to the carrier frame, especially when in an engaged position.

9 Claims, 20 Drawing Sheets

U.S. PATENT DOCUMENTS

| | | | | |
|---|---|---|---|---|
| 4,712,966 A | * | 12/1987 | Gross | 414/458 |
| 4,765,594 A | | 8/1988 | Riedl et al. | 254/45 |
| 4,897,011 A | | 1/1990 | Brower | 414/459 |
| 5,006,031 A | * | 4/1991 | Fossing et al. | 414/458 |
| 5,417,540 A | | 5/1995 | Cox | 414/498 |
| 5,800,114 A | * | 9/1998 | Secondi | 414/458 |
| 6,071,062 A | * | 6/2000 | Warhurst et al. | 414/498 |
| 6,155,770 A | * | 12/2000 | Warhurst | 414/498 |
| 6,546,312 B1 | * | 4/2003 | Matsumoto | 700/213 |
| 2005/0225066 A1 | | 10/2005 | Metternich | 280/763.1 |

FOREIGN PATENT DOCUMENTS

| | | |
|---|---|---|
| AU | 199896082 B2 | 12/1998 |
| AU | 2006100080 A9 | 1/2006 |
| DE | 25 20 645 A1 | 11/1976 |
| WO | WO 01/64476 A1 | 10/2000 |
| WO | WO 01/64476 A | 9/2001 |
| WO | WO 2004/074136 A1 | 2/2004 |
| WO | WO 2004/106110 A1 | 6/2004 |
| WO | WO 2005/120895 A1 | 6/2005 |
| WO | WO 2006/009511 A1 | 7/2005 |

* cited by examiner

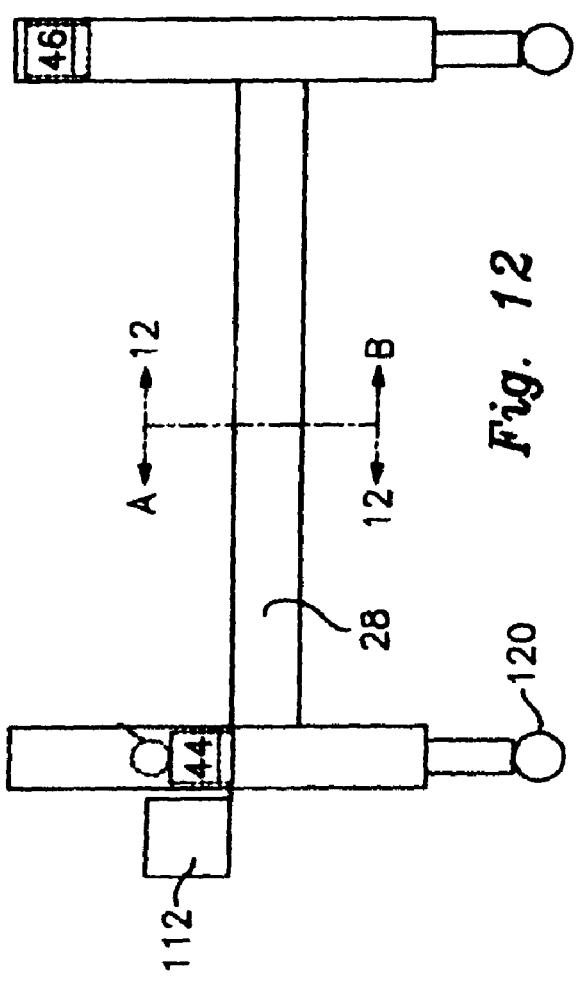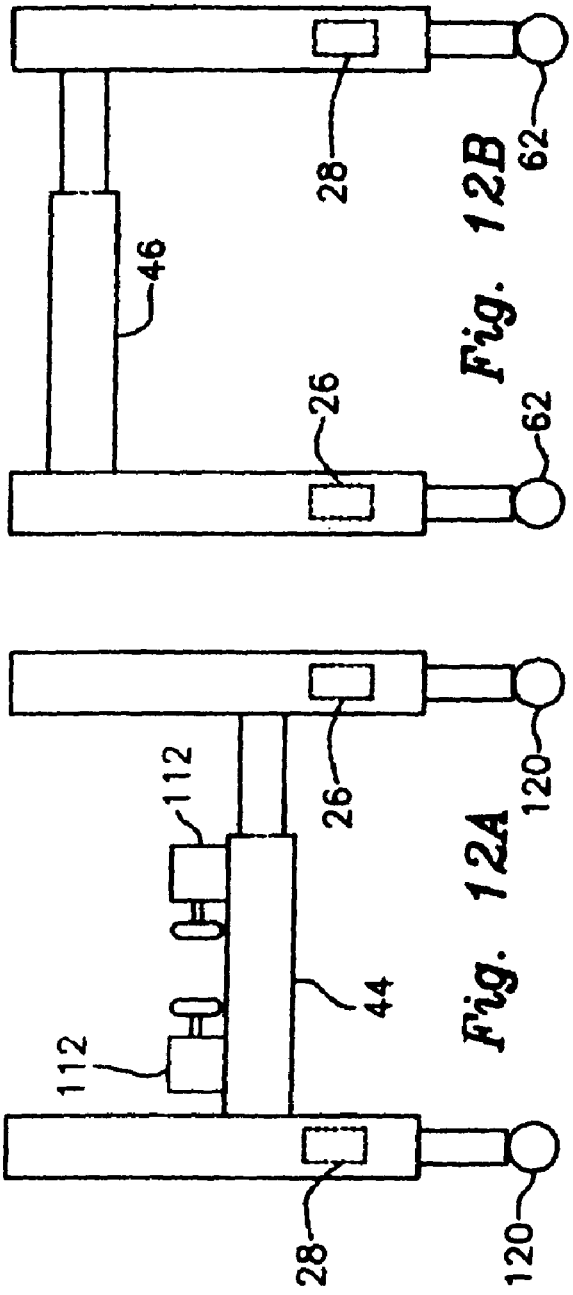

APPARATUS FOR LIFTING, HANDLING AND TRANSPORTING A CONTAINER

CROSS-REFERENCE TO RELATED APPLICATION

This application claims priority from U.S. Provisional Patent Application No. 60/672,622 filed on Apr. 18, 2005.

FIELD OF THE INVENTION

The present invention relates generally to the field of storage container transportation and moving services and products, and pertains, more specifically, to a method and apparatus for lifting and handling a storage container, loading it onto a road vehicle, transporting it to a given location, and unloading the container from the vehicle.

BACKGROUND OF THE INVENTION

International transportation and storage of cargo has been revolutionized by the use of large, hexahedral-shaped metal containers suitable for stacking. Such containers are of standard dimensions and constructed to certain standards to facilitate their handling, stacking, and storage. Further, the containers are readily transported on and transferred between open ship decks, road vehicles, railway stock, storage depots, and the like.

Efficiency requires filling a standard container with cargo, preferably from a single supplier, to minimize handling costs, although container space may be shared between multiple parties. If container space is shared between multiple parties, the same container may have to be transported to, or otherwise handled by, each party using the container.

In an effort to alleviate this additional handling, "mini"-containers, smaller than the standard container, have also been devised for holding small cargo loads. To assist in transportation and/or stacking of the mini-containers, a number of the mini-containers may be locked together to form a single standard container, and then separated at a deconsolidation depot for forwarding to separate receivers.

Industry often has requirements to lift and transport containers. Many freight yards and ocean shipping docks use cranes of various types with lifting cables that attach to the corner brackets found on most containers. Methods and apparatuses for lifting and transporting containers are known and, heretofore, have been configured in different ways. Some examples of container handling systems in the prior art are seen in the following:

Dousset, U.S. Pat. No. 3,541,598, shows two end-fitted structures, called portals, which are wheeled and have hydraulic jacks. They are attached at upper and lower corners of the container. There are no longitudinal frame elements, only transverse ones. The container thus serves as a structural frame, and must be strong enough to support typically up to 15,000 pounds of cargo. There is no method or apparatus for moving and positioning the portals from the vehicle to the container, and back. This is apparently done by hand. There is no structure to quickly and safely lock the portals onto the vehicle for transport, with or without the container.

Fossing, U.S. Pat. No. 5,006,031, also uses two structures, but they are connected together after lifting. The two-wheeled sections, with hydraulic jacks, are attached to the longitudinal sides of the container, not the ends. Cross pieces are connected beneath the container. The attachment brackets have an H-shape.

Bury, U.S. Pat. No. 3,881,689, discloses a four-sided frame for lifting camper bodies. It is U-shaped to fit around the body and has a cross bar fitted across the open end. The jacks are mechanical, and raise the container with respect to the frame. There is no method or apparatus for moving and positioning the frame from the vehicle to the body, and back. The camper body cannot be lowered to the ground. The frame must be dismantled by hand and stored or carried on the vehicle.

Dafnis, U.S. Pat. No. 2,197,375, illustrates a wheeled lifter and transporter for railroad cars. The frame is disposed over the top of the container. Hydraulic jacks fit below projecting brackets on the car, raising the car with respect to the frame. There is no transport vehicle.

Lion, U.S. Pat. No. 2,937,879, shows a container with built-in hydraulic jacks with wheels, at each corner. The container structure serves as a frame. There is no transport vehicle.

Fulmer, U.S. Pat. No. 3,243,193, discloses an attachable running gear to be fitted to the ends of a container. It consists of a pair of brackets and wheels. The brackets are attached to the ends of the container, then connected together underneath. Hydraulic jacks raise the container.

Concha, U.S. Pat. No. 4,297,068, also discloses an attachable running gear to be fitted to the ends of a container. It consists of a pair of brackets and wheels, with hydraulic jacks.

Gross, U.S. Pat. No. 4,712,966, illustrates a liftable and transportable rack for stackable cargo. A pair of wheeled brackets with hydraulic jacks fit into the rack ends.

Riedl, U.S. Pat. No. 4,765,594, displays four separate wheel and jack assemblies that are attached to the corners of the container. The jacks are rack and pinion type. The assemblies are not interconnected.

Fulmer, Concha, Riedl, and Fossing show no transport vehicle. The wheels mounted to the container form a trailer.

Rieschel, U.S. Pat. No. 3,744,652, discloses a hydraulic hoisting apparatus for a gantry vehicle with hydraulic motor means for propelling the vehicle and with front and rear hoisting devices. Rieschel shows no transport vehicle.

DE-29505618U discloses a self-propelled container lift truck that can be loaded onto and off a transport vehicle. The container lift truck is used to move containers from one location to another. A "transport trestle" is used to attach the container lift truck to the bed of the transport vehicle, e.g., a truck. The container lift truck and a container cannot, however, be loaded onto the bed of a transport vehicle together.

Warhurst, U.S. Pat. Nos. 6,071,062 and 6,155,770, both of which disclosures are incorporated herein by reference, generally disclose a mobile carrier frame for loading and unloading a container from a truck bed.

A container transporting device of Porta Stor, Inc. of Hudson, Fla., operates essentially in the same manner as the container handling system described in Warhurst, U.S. Pat. No. 6,071,062, except that one of the transverse elements of the Porta Stor carrier frame has been moved to the opposite end, leaving one end of the frame open.

The prior art devices do not disclose a container handling apparatus that can be easily maneuvered to pick up and drop off containers from tight spaces, such as parallel parking spaces or similar tight locations. Accordingly, there exists a need for a container handling system in which a mobile carrier frame can be maneuvered into parallel parking spaces or similar tight spaces. There is also a need for such a system that can be operated via remote control.

SUMMARY OF THE INVENTION

The present invention is a mobile carrier frame that can be used for lifting, handling, and transporting containers on to and off of the platform of a transport vehicle, such as a truck. The carrier frame of the present invention operates in a generally similar manner to the frame described in Warhurst, U.S. Pat. No. 6,071,062, which disclosure has been incorporated herein by reference. Various structural changes have been made, however, to improve the maneuverability of the frame into tight spaces, such as parallel parking spaces. Also, additional structural support elements have been added to certain embodiments of the frame.

The mobile carrier frame, which has front and rear ends and right and left sides, comprises two or more longitudinal elements and at least one transverse element connected between two of the longitudinal elements. The carrier frame further includes a front-right wheel assembly underneath and in proximity to the front, right corner of the carrier frame; a front-left wheel assembly underneath and in proximity to the front, left corner of the carrier frame; a rear-right wheel assembly underneath and in proximity to the rear, right corner of the carrier frame; and a rear-left wheel assembly underneath and in proximity to the rear, left corner of the carrier frame.

In a preferred embodiment, to more easily maneuver the carrier frame into tight spaces, such as parallel parking spaces, one of the front-right wheel assembly and front-left wheel assembly comprises a drive mechanism, and one of the rear-right wheel assembly and rear-left wheel assembly also comprises a drive mechanism. Typical configurations of this embodiment include configurations where the front-right wheel assembly and rear-right wheel assembly have respective drive mechanisms, and configurations where the front-left wheel assembly and the rear-left wheel assembly have respective drive mechanisms. Wheel assemblies that have a drive mechanism preferably include a non-swivel connection, while wheel assemblies that do not have a drive mechanism preferably include a swivel connection. Wheel assemblies can comprise one or more wheels. In a preferred embodiment, the wheel assemblies comprise two wheels.

The mobile carrier frame may be remotely operated. In a preferred embodiment, the carrier frame, which has controls that control operation of the carrier frame, includes a remote control panel that communicates with the controls of the carrier frame. A wireless remote control device in turn communicates with the remote control panel for remote operation of the carrier frame. An advantage of a remotely controlled carrier frame is that it allows an operator to look for obstructions as he or she walks around the mobile carrier frame while maneuvering the carrier frame, for instance into tights spaces, such as a parallel parking space.

In an alternative embodiment, the remote control device may be connected (e.g., via cable) directly to the controls of the carrier frame for remote operation of the carrier frame. However, a wireless remote control device obviates the need for a lengthy cable.

In another alternative embodiment, the remote control may be augmented or even replaced by a plurality of control buttons placed around the carrier frame so that an operator can operate the carrier frame from various positions around the carrier frame via cabled remote control devices.

In another embodiment, the carrier frame further comprises at least two upright members at the rear end of the carrier frame, and a movable transverse element connected between the two upright members. The transverse element is designed to provide additional structural support to the carrier frame, especially when in an engaged position. Configurations of such transverse elements can include a transverse element that is rotatable over the top of a container during loading, and a transverse element that comprises one or more parts, which can be rotated from a disengaged position to an engaged position, to provide additional structural support to the frame.

BRIEF DESCRIPTION OF THE DRAWINGS

The invention will be more fully understood, while still further features and advantages will become apparent, in the following detailed description of preferred embodiments thereof illustrated in the accompanying drawings, in which:

FIG. 12 is a side elevational view of the carrier frame, showing the carrier frame with self-contained gasoline engine driven hydraulic pumps and relative height position of the rear transverse element;

FIG. 12A is a sectional elevation view of the carrier frame of FIG. 12 depicting the gasoline engine driven hydraulic pumps;

FIG. 12B is a sectional elevation view of the carrier frame of FIG. 12 depicting the rear transverse element;

DETAILED DESCRIPTION OF THE DRAWINGS

Figure 1:
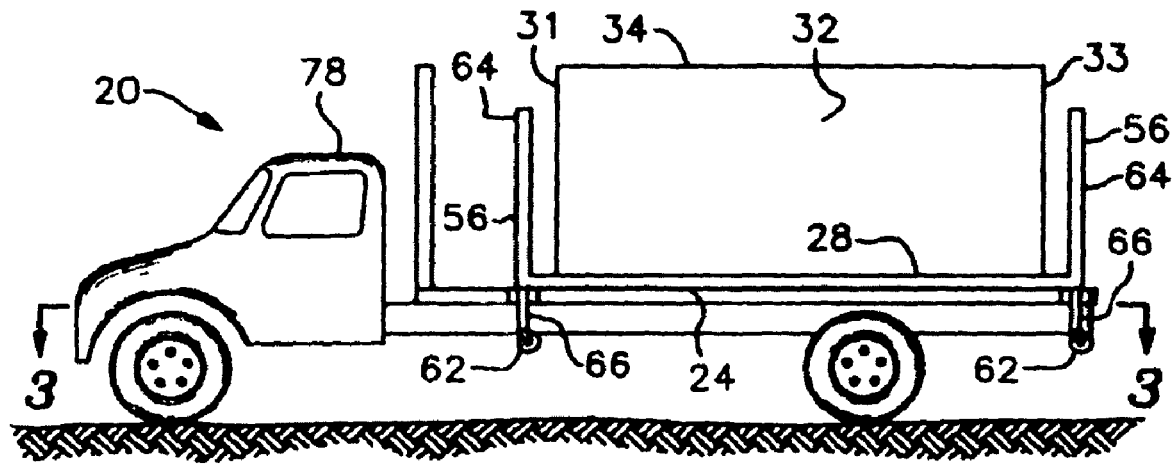
FIG. 1 is a side elevational view of a transport vehicle transporting a storage container and a carrier frame constructed in accordance with one embodiment of the invention.
Figure 2:
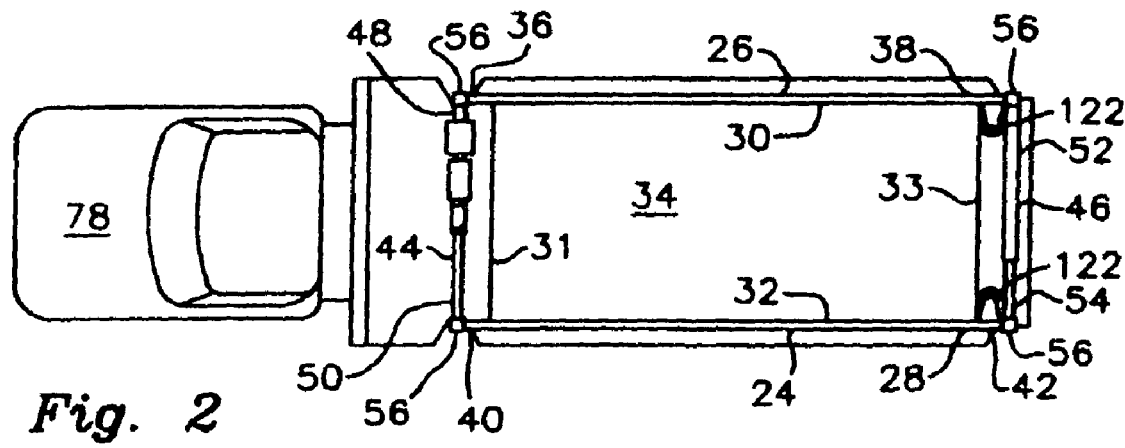
FIG. 2 is a plan view of the transport vehicle, storage container, and carrier frame of FIG. 1.

The drawings, in general, and especially FIGS. 1, 2, 4, 5, 7, and 10 show apparatus 20 for lifting and transporting container 34 having right and left sides, 30 and 32, respectively, and front and rear ends, 31 and 33 respectively. Apparatus 20 includes carrier frame 24 having right 26 and left 28 longitudinal elements juxtaposed with the right 30 and left 32 sides, respectively of container 34. Right longitudinal element 26 extends between opposite first 36, and second 38 ends. Left longitudinal element 28 extends between opposite first 40, and second 42 ends.

Carrier frame 24 has front 44 and rear 46 transverse elements juxtaposed with front 31 and rear 33 ends, respectively, of container 34. Front transverse element 44 extends between opposite right 48 and left 50 ends. Rear transverse element 46 extends between opposite right 52 and left 54 ends. Left end 50 of front transverse element 44 is adjacent to first 40 end of left longitudinal element 28. Right end 48 of front transverse element 44 is adjacent to first end 36 of right longitudinal element 26.

A transport vehicle 78 (shown in shown in FIGS. 1-4), such as a specially modified truck, is provided and has a platform 80 suitable for transporting the container 34 and carrier frame 24 simultaneously.

As shown in FIGS. 6, 8, 9, and 11, carrier frame 24 includes four generally upright members 56 attached to carrier frame 24, each upright member 56 extending between opposite upper 58 and lower 60 ends. Wheels 62 are attached to each upright member lower end 60, for ground 110 bearing and relative movement of the upright members 56 with the ground 110. Upright members 56 each comprise a tubular fixed element 64 attached to the carrier frame 24 and a tubular sliding element 66 mounted for sliding movement within fixed element 64.

Alternative embodiments of the invention may have the ground bearing means, including wheel assemblies, attached to one or more of the longitudinal or transverse elements. This may be in addition to (or instead on the ground bearing means attached to the upright members. The preferred embodiment includes ground bearing means attached to the upright members with the advantage of having actuators change the clearance of the apparatus with respect to the ground by taking advantage of implementing the upright members with a telescoping structure in combination with one or more actuators.

Figure 11:
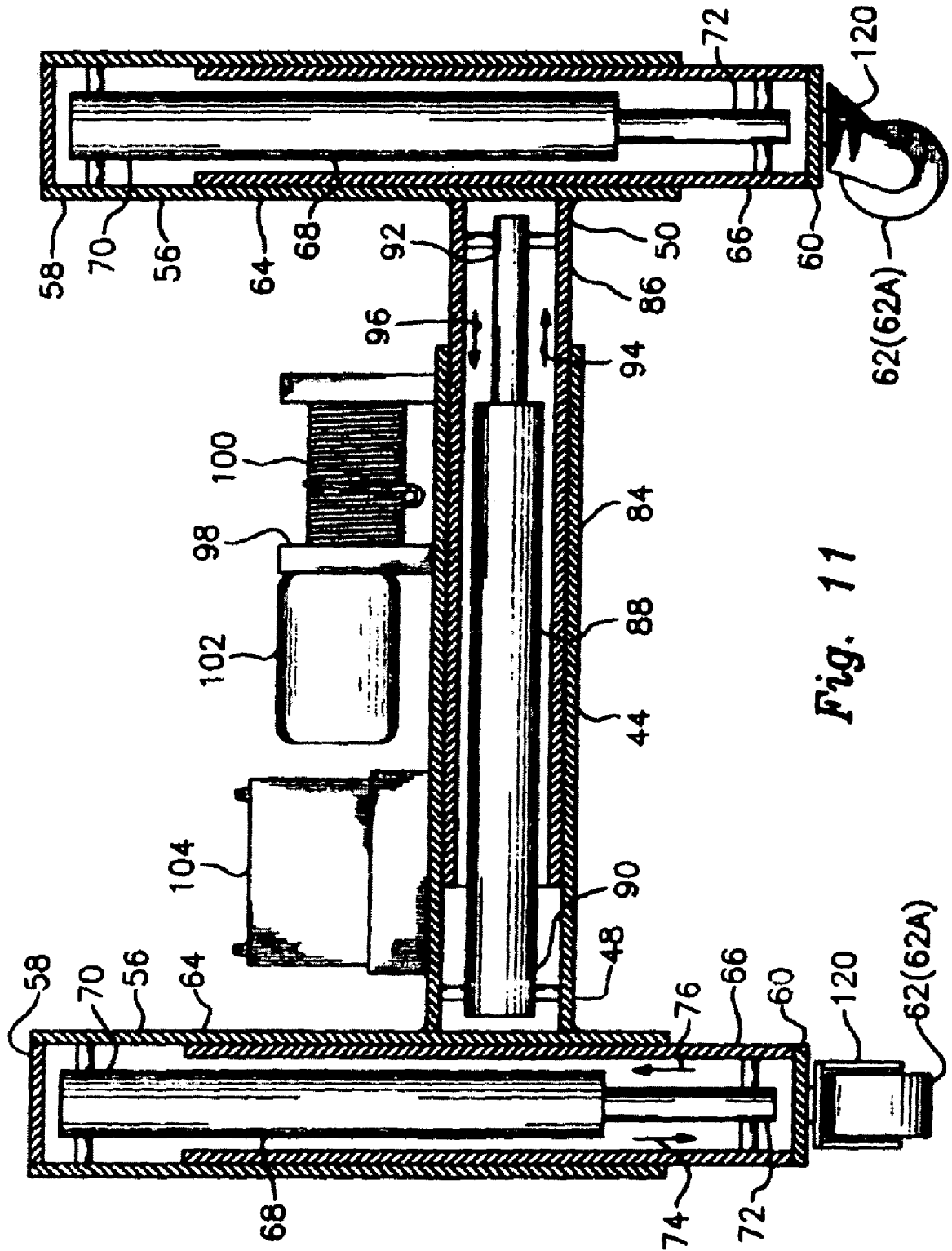
FIG. 11 is a front sectional elevational view of the carrier frame, showing the carrier frame lowered, the section taken along lines 11-11 of FIG. 8.

As shown in FIG. 11, means for elevating in the preferred embodiment is a plurality of actuators 68 mounted within upright members 56 for elevating and lowering carrier frame 24 with respect to ground 110. One or more of actuators 68 may alternatively be mounted adjacent to telescoping upright member 56. Each actuator 68 has opposite first 70 and second 72 ends. First end 70 is attached to upright member fixed element 64. Second end 72 is attached to upright member sliding element 66. Thus, upon being actuated in an extending direction (as shown by arrow 74 in FIG. 11) actuators 68 will slideably extend sliding element 66 from within fixed element 64 in a telescoping manner, so as to elevate carrier frame 24. Conversely, upon being actuated in a retracting direction (as shown by arrow 76 in FIG. 11), actuators 68 will slideably retract sliding element 66 into fixed element 64 in a telescoping manner, so as to lower carrier frame 24.

Figure 13:
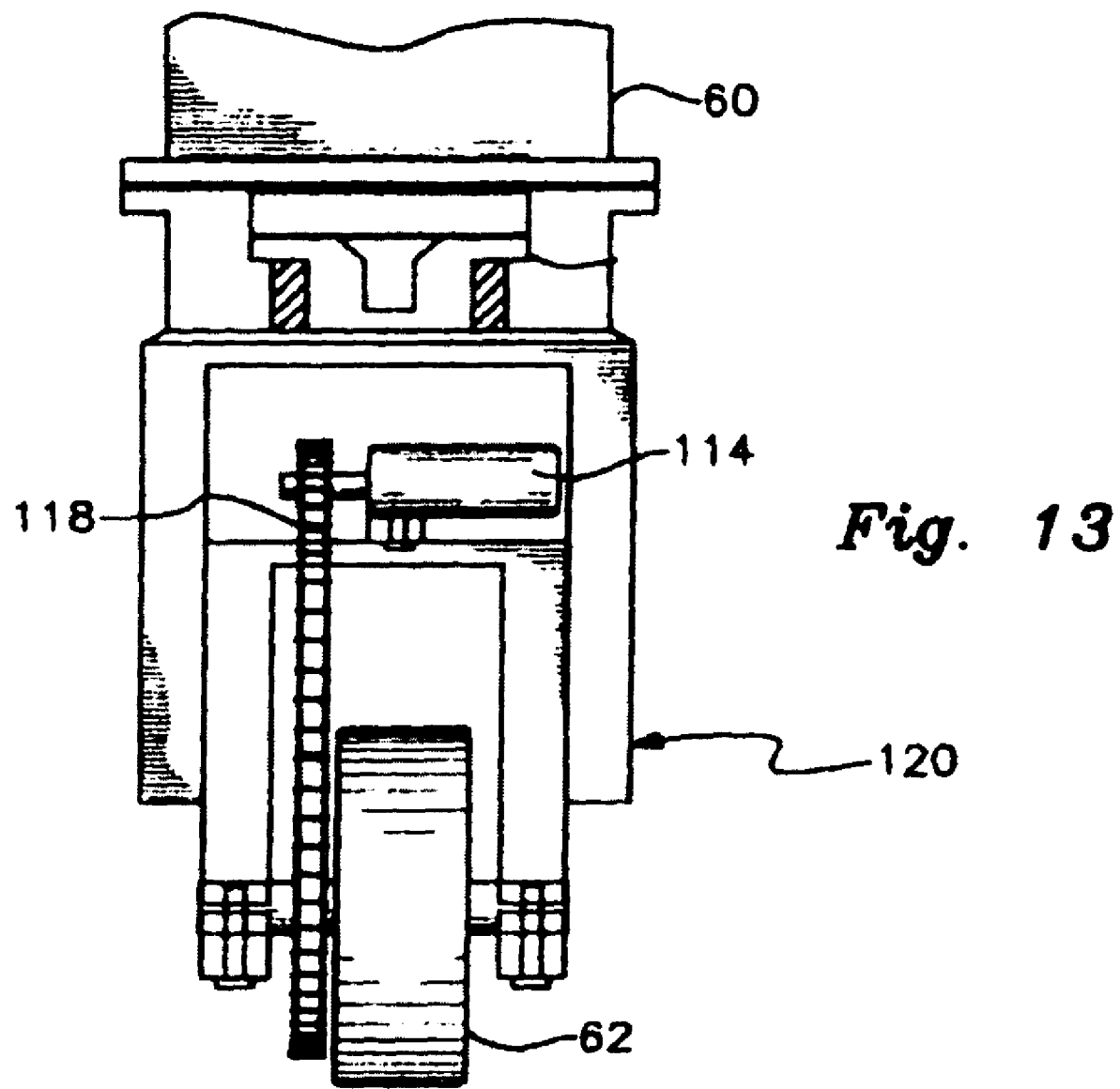
FIG. 13 is a perspective view of one embodiment of the steering and mobility means depicting a wheel assembly including a motor and sprocket chain drive.

Changing the bearing means under lower ends 60 of front and rear upright members 56 from single wheel assembly 62 (as shown in FIG. 13) to dual wheel single axle assembly 62A (shown in FIGS. 15-17 and 17A) provides increased weight handling capabilities for the apparatus.

Figure 15:
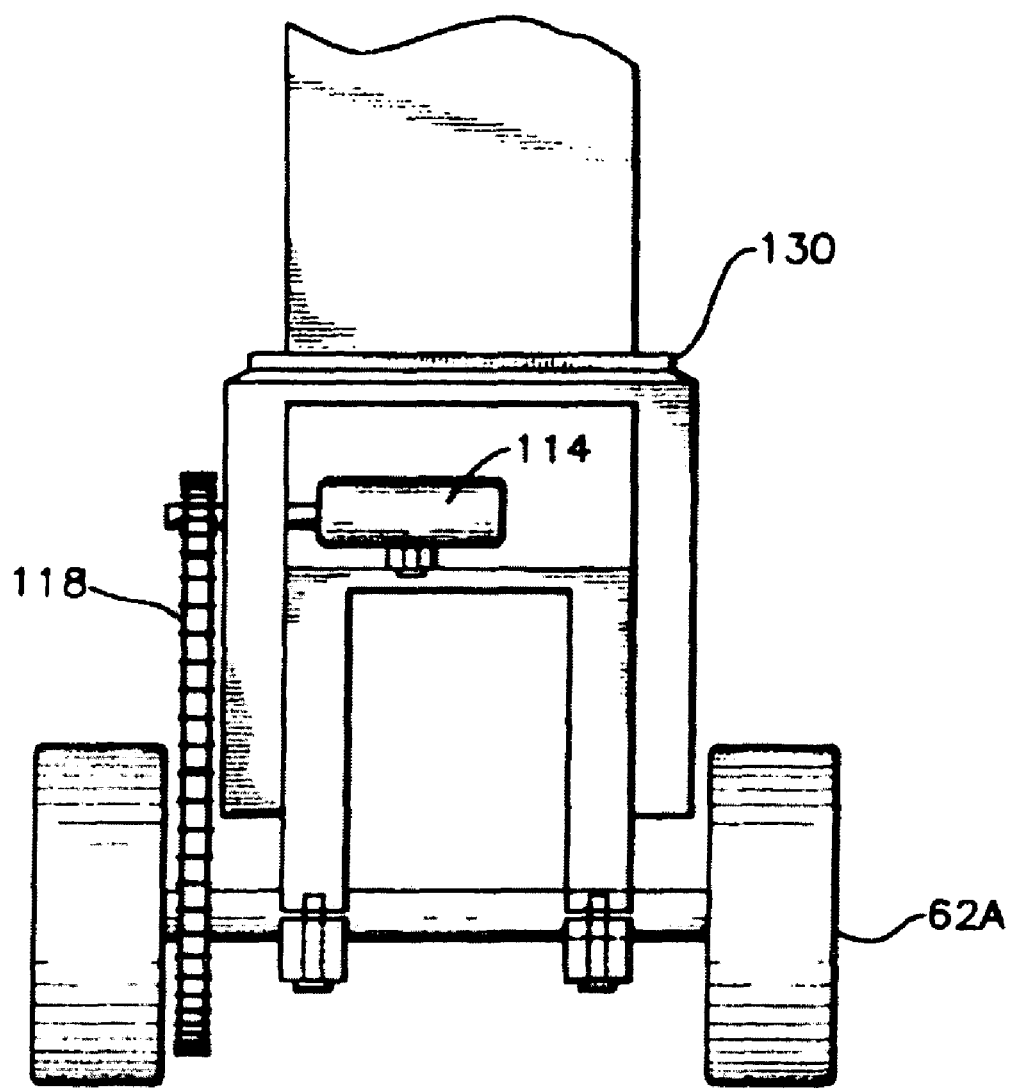
FIG. 15 is a perspective view of one embodiment of the steering and mobility means depicting a non-swivel connection with sprocket chain drive and dual wheel single axle assembly.
Figure 16:
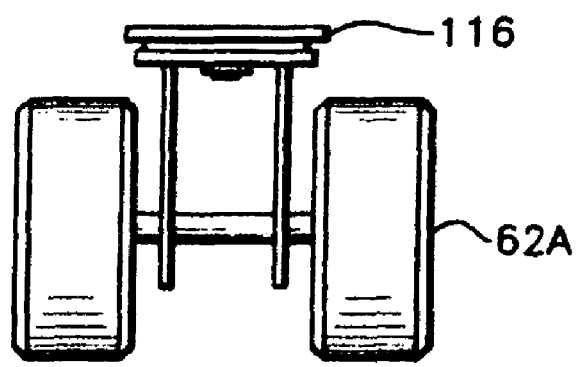
FIG. 16 is a depiction of a dual wheel single axle assembly incorporating a swivel connection.
Figure 17:
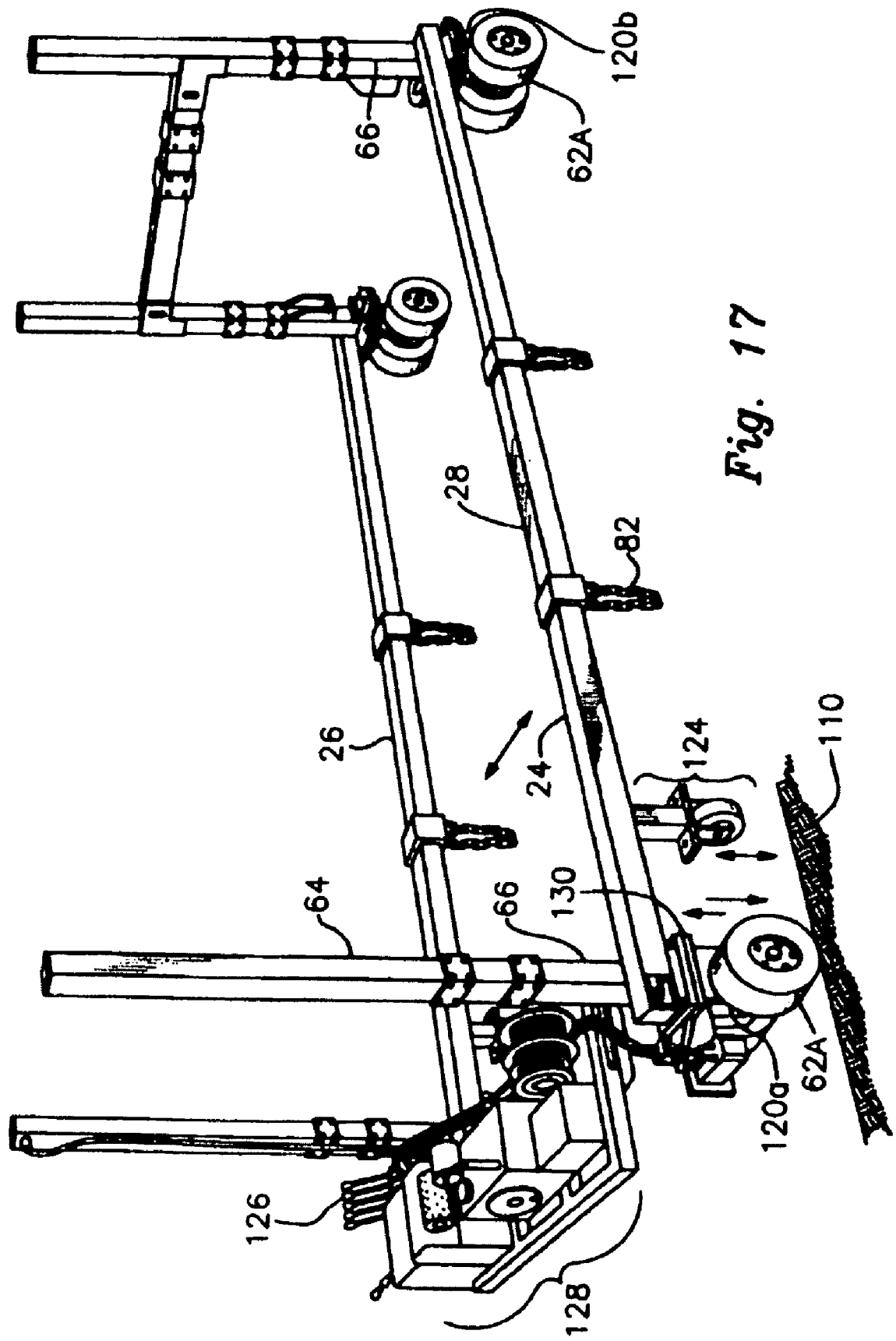
FIG. 17 is a perspective view of an alternative embodiment of the carrier frame of FIG. 8 without the container.

In a practical application of this embodiment as well as the embodiment using a single wheel 62, it was desirable to make the wheel 62, 62A such that the connection is non-swivel 130 under the lower end 60 of the front upright members 56 (as depicted in FIGS. 4, 6, 15 and 17). However, the wheels 62, 62A at the lower ends 60 of the rear upright members 56 would have a swivel connection at 116 as depicted in FIG. 16. The combined swivel wheel assembly, 120*b* in FIG. 17, does not include a driving mechanism. The combined non-swivel wheel assembly, 120*a* in FIG. 17, provides a driving mechanism, for instance a sprocket and chain drive 118 (shown in FIG. 15 with motor 114). As shown in FIG. 17, a typical application of the invention would also include a hydraulic pump and motor assembly 128, generally gasoline or diesel operated, mounted at the front of carrier frame 24. Alternatively, the hydraulic pump and motor assembly 128 may be operated by propane, bio-fuels, or an internal combustion engine. Hydraulic controls 126 are readily accessible for an operator to manipulate the carrier frame 24 to handle and transport containers 34.

Figure 22A:
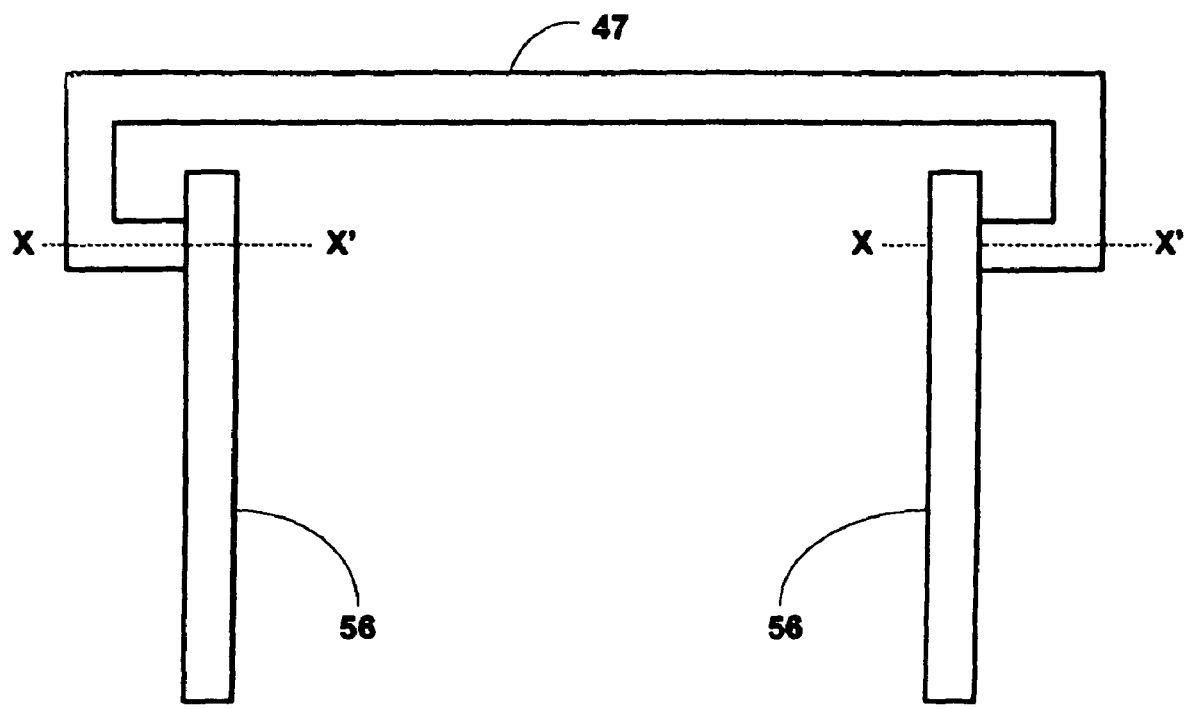
FIGS. 22A-22B illustrate possible configurations for a transverse element that can either be rotated over a container, or be engaged around a container.
Figure 22B:
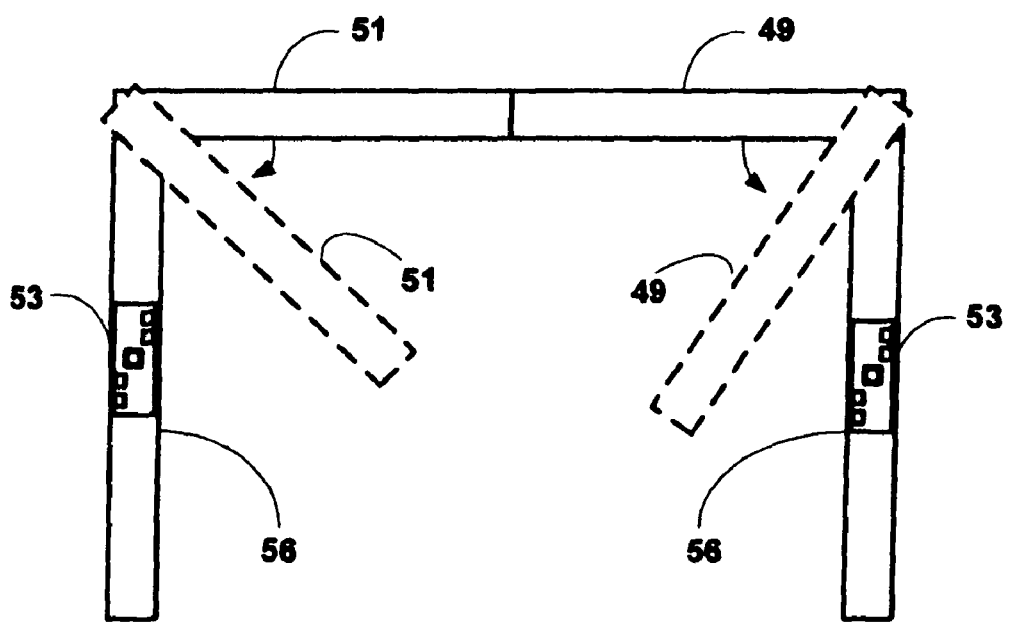

In an alternative embodiment, transverse element 46 may be absent or may be formed by engaging one or more parts to stabilize carrier frame 24 around the container. Configurations for such transverse elements include shapes suited to allow clearance of container 34 while providing structural support to upright members 56, as shown in FIGS. 22A and 22B. FIG. 22A shows transverse element 47 that can rotate about axis X-X' in a downward direction over the top of the container during loading to provide additional structural support to frame 24. FIG. 22B shows parts 49 and 51 of a transverse element that can be rotated from a disengaged position (shown by broken lines) to an engaged position (shown by solid lines) to provide additional structural support to frame 24 during loading. The mechanism for effecting engagement or disengagement can be any of the arrangements known to one of ordinary skill in the art to provide sufficient strength and rigidity to the transverse element.

As shown in FIGS. 4, 6, 8, 9, and most notably in FIG. 17, in order to provide additional versatility to maneuver the apparatus in a lateral direction for expansion and contraction of the carrier frame 24 when the apparatus is made with non-swivel connections under the front upright members 56 and swivel connections under the rear upright members 56, a fixed laterally directed wheel assembly 124 extends downwardly a predetermined distance from each of the right and left longitudinal elements 26, 28 near the front transverse element 44. The fixed laterally directed wheel assemblies 124 allow selective lateral expansion of the carrier frame 24 to clear a transport vehicle platform 80, the container 34 or both for positioning, and allow contraction of the carrier frame 24 into close juxtaposition with a transport vehicle platform 80, the container 34 or both for transporting.

In a preferred embodiment, longitudinal elements 26, 28 would be lowered until the fixed laterally directed wheel assemblies 124 contact the ground 110. Where the wheel assemblies 124 are located near the front transverse element 44, the front upright members 56 will elevate such that wheels 62, 62A will no longer have contact with the ground 110. The carrier frame 24 can then be expanded or contracted as necessary to accommodate clearing a container 34 or platform 80. When the desired position is reached, the front actuators 68 will slideably extend the sliding element 66 from within fixed element 64 in a telescoping manner so as to resume contact to the ground 110 with wheels 62, 62A. The fixed laterally directed wheel assemblies 124 are then further elevated to facilitate steering and movement of the carrier frame 24 to handle containers 34.

Although the use of steering and mobility means 120 as depicted in FIG. 13 or 120*a*, 120*b* in FIG. 17 are preferred embodiments, a winch 98 and cable 100 (shown in FIGS. 7, 10, and 11) may alternatively or in conjunction with the mobility and steering means 120, 120*a*, 120*b* be connected to the carrier frame 24, for moving and positioning the carrier frame 24 with respect to the container 34, and for moving and positioning the carrier frame 24 and container 34 together with respect to the vehicle 78. In this embodiment, the winch 98 is typically mounted on the front transverse element 44. The winch 98 is typically operated by an electric motor 102, which is powered by a storage battery 104. The electrical connections for these parts are not shown in the drawing, but are known to anyone skilled in the art.

As shown in FIGS. 4, 6-8, and most notably in FIG. 17, supporting means 82 are connected to the carrier frame 24 and to the container 34 for supporting the container 34 by the carrier frame 24. Typically, the supporting means 82 will be four to six chains affixed to the longitudinal elements 28 (as depicted in FIG. 17). A hook is located on the other end of each chain 82 for engaging an eye (not shown) on the container 34. Alternatively, the supporting means 82 can be affixed to the upright members 56 (not shown).

In a preferred embodiment, the carrier frame 24 includes a pair of guide wheels 122 (as shown in FIGS. 2, 5, 7, and 10), each wheel being mounted for rotation on a generally vertical axis on an upright member 56 adjacent the rear transverse element 46, with the guide wheels 122 facing inward toward the container 34. As the carrier frame 24 is being moved into position around the container 34, the guide wheels 122 roll against the container 34 to reduce friction therewith, and thus facilitate positioning the carrier frame 24 with the container 34.

Transverse elements 44, 46 are selectively adjustable-in-length, so as to allow expansion of carrier frame 24 to clear vehicle 78 and container 34 for positioning, and contraction of carrier frame 24 into close juxtaposition with vehicle 78 and container 34 for transport.

As shown in FIG. 11, front transverse element 44 further comprises tubular fixed element 84, and tubular sliding element 86 mounted for sliding movement within fixed element 84. Actuator 88 is mounted within front transverse element 44. As with upright members 56, actuator 88 may be mounted on the outside of transverse element 44. Actuator 88 has opposite first 90 and second 92 ends, first end 90 attached to fixed element 84, and second end 92 attached to sliding element 86. Thus, upon being actuated in an extending direction as shown by arrow 94 in FIG. 11, actuator 88 extends sliding member 86 from within fixed member 84 in a telescoping manner. Conversely, upon being actuated in retracting direction (as shown by arrow 96 in FIG. 11), actuator 88 will slideably retract sliding element 86 into fixed element 84 in a telescoping manner, so as to contract carrier frame 24.

All of the actuators, in the upright members and in the front and rear transverse elements, are typically hydraulic cylinder type actuators. The actuators are powered by gasoline engine driven hydraulic pumps 112 (shown in FIGS. 12, 12A, and 14), although electric or pneumatic and other systems may be used in alternative embodiments. The hoses, valves, etc., are not shown in the drawing, but are well known, and can be adapted by anyone skilled in the art. Alternatively, the actuators may be powered by propane, bio-fuels, or an internal combustion engine.

Figure 14:
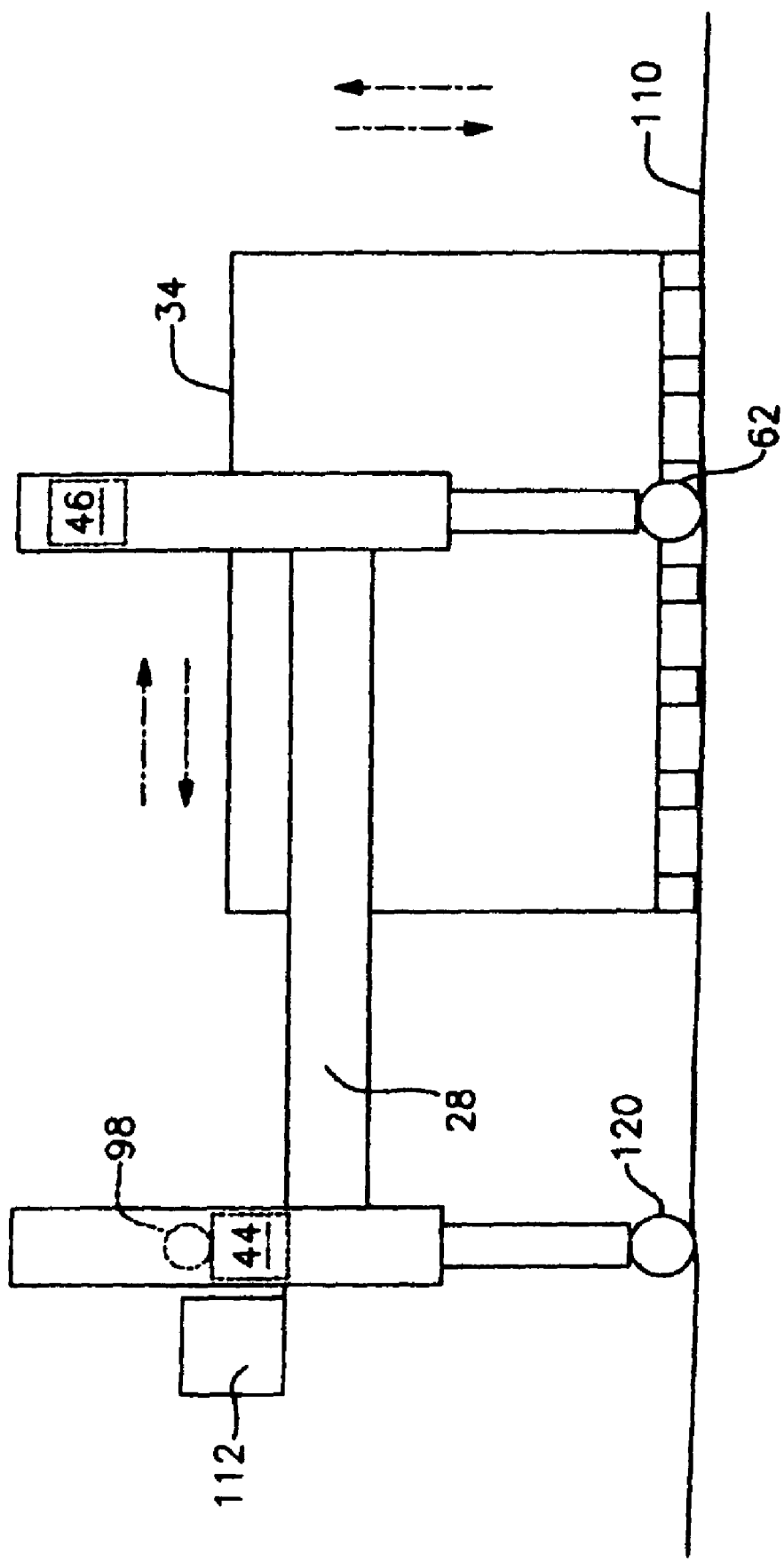
FIG. 14 is a side elevational view of the carrier frame of FIG. 1 passing over the container.

As shown in FIGS. 12A-12B, 13, 14, and 17-17A, steering and ground bearing mobility means 120, 120*a*, 120*b* are included with front upright member lower ends 60 and/or front and rear upright member lower ends 60. Using these embodiments, rear transverse element 46 is shown in a position sufficient to clear the height of container 34 as depicted in FIGS. 12B and 14.

Figure 3:
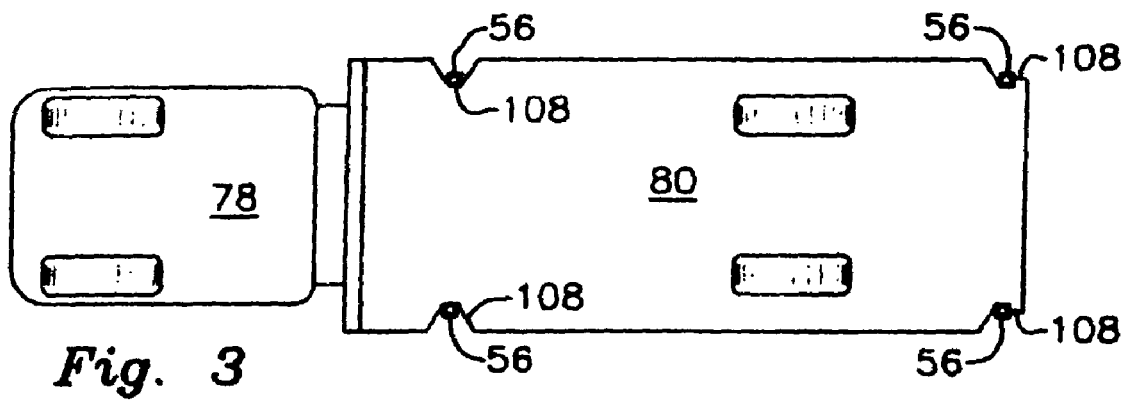
FIG. 3 is a sectional view of the transport vehicle, storage container, and carrier frame of FIG. 1, the section being taken along lines 3-3 of FIG. 1.
Figure 4:
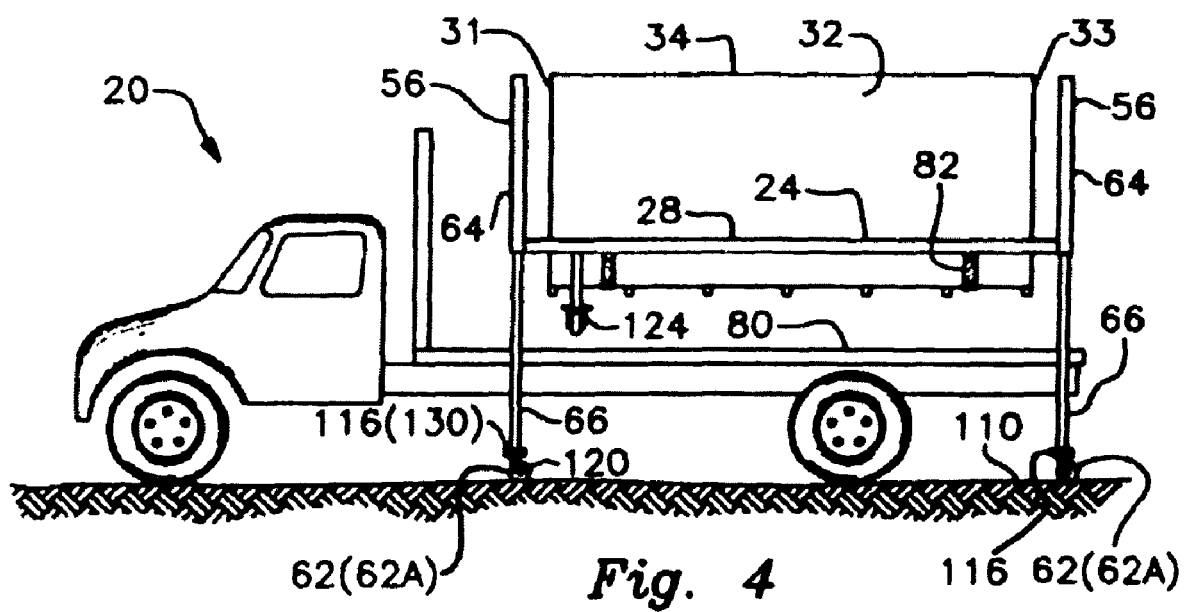
FIG. 4 is a side elevational view of the transport vehicle, storage container and another embodiment of the carrier frame, showing the upright elements extended to the ground and the carrier frame and container elevated above the transport vehicle platform.
Figure 5:
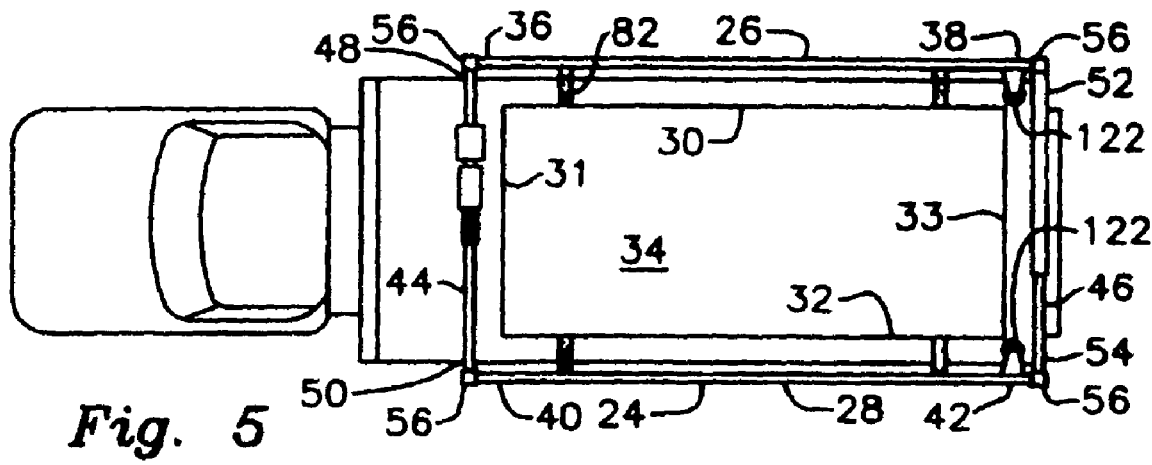
FIG. 5 is a plan view of FIG. 4, showing the transport vehicle, storage container and carrier frame.
Figure 6:
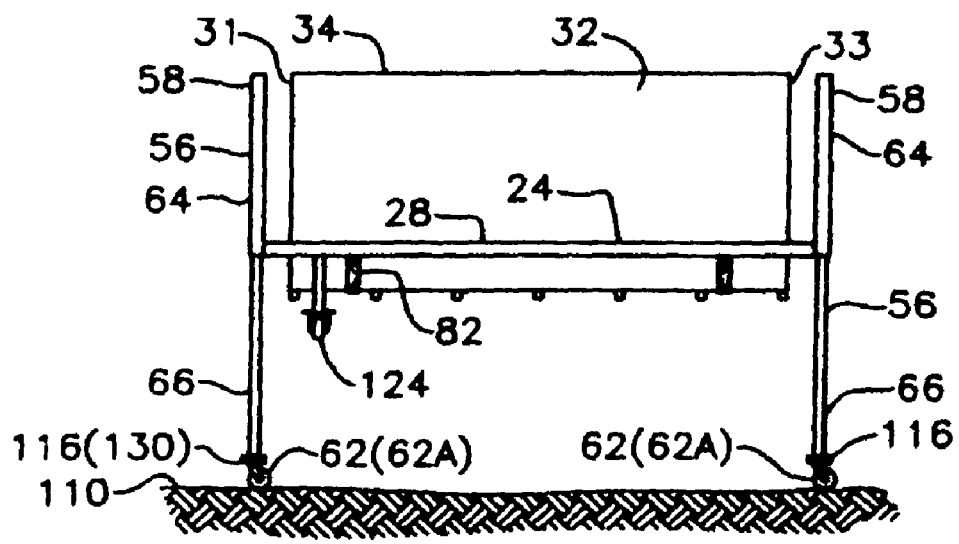
FIG. 6 is a side elevational view of the storage container and carrier frame of FIG. 4, showing the carrier frame and container elevated above the level of the transport vehicle platform.
Figure 7:
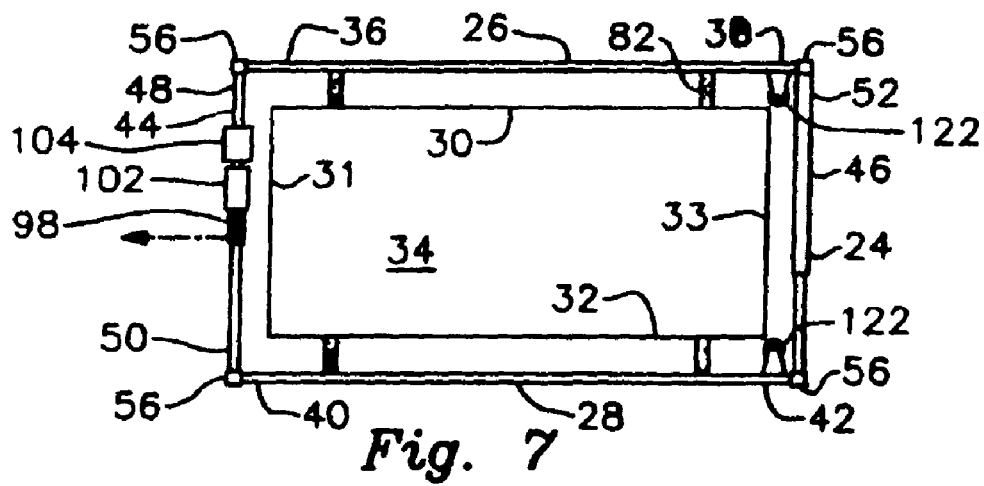
FIG. 7 is a plan view of FIG. 6.
Figure 8:
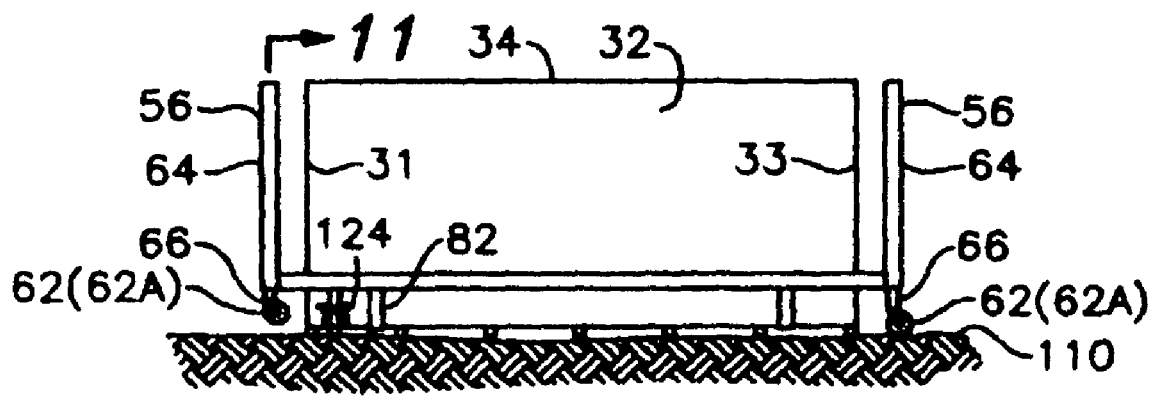
FIG. 8 is a side elevational view of the storage container and carrier frame of FIG. 4, showing the carrier frame and container lowered with the container resting upon the ground.
Figure 9:
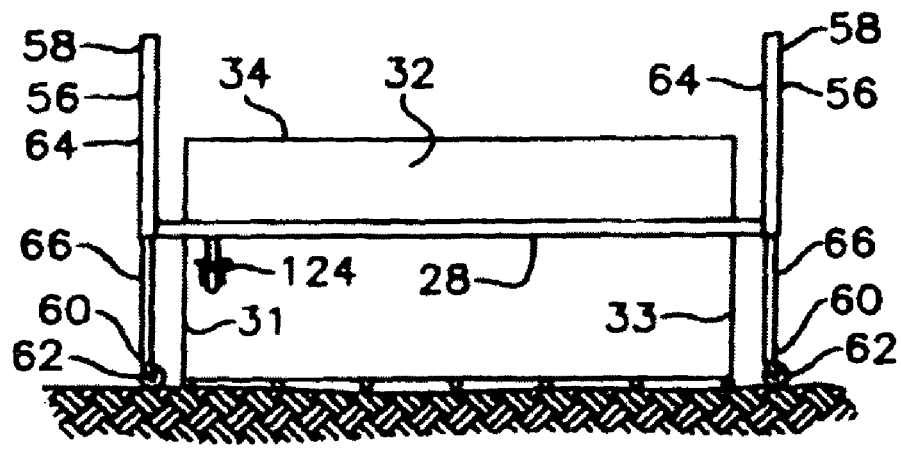
FIG. 9 is a side elevational view of the storage container and carrier frame of FIG. 4, showing the carrier frame elevated above the level of the transport vehicle platform with the container resting upon the ground.
Figure 10:
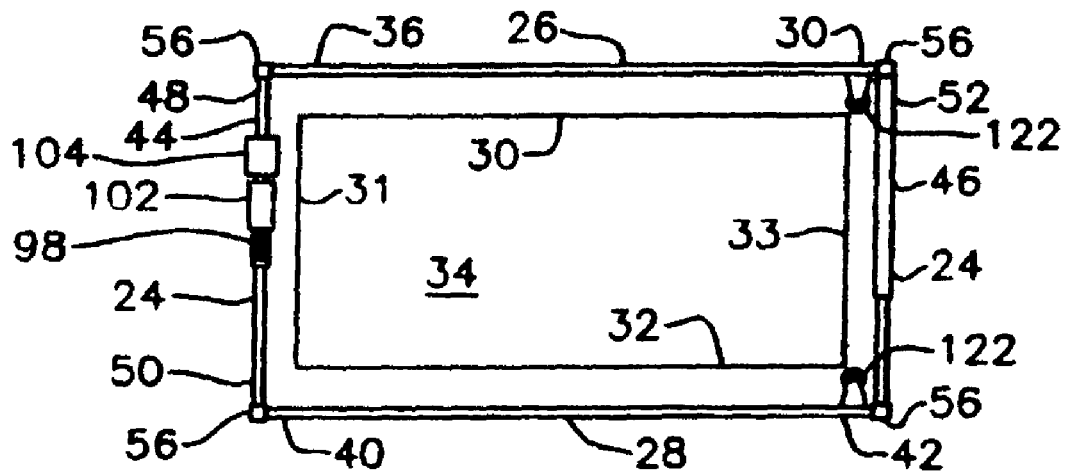
FIG. 10 is a plan view of FIG. 9.

As shown in FIG. 3, vehicle platform 80 includes notches 108 on either side to receive and releasably retain upright members 56 upon contraction of carrier frame 24 into close juxtaposition with vehicle 78, thereby locking carrier frame 24 to vehicle 78, allowing safe transport. However, in most cases, notches 108 are not necessary and the apparatus as described herein operates satisfactorily with or without notches 108.

Figure 21A:
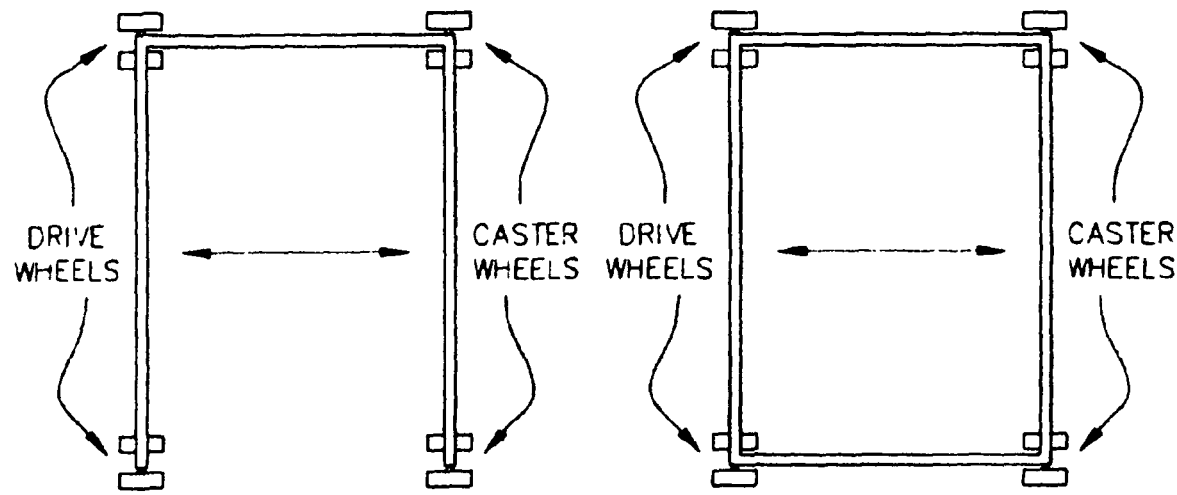
FIGS. 21A-21B illustrate possible drive wheel and caster wheel configurations on 3 or 4 sided frame, with FIG. 21A being more suitable for parallel parking areas and FIG. 21B being the more common arrangement.
Figure 21B:
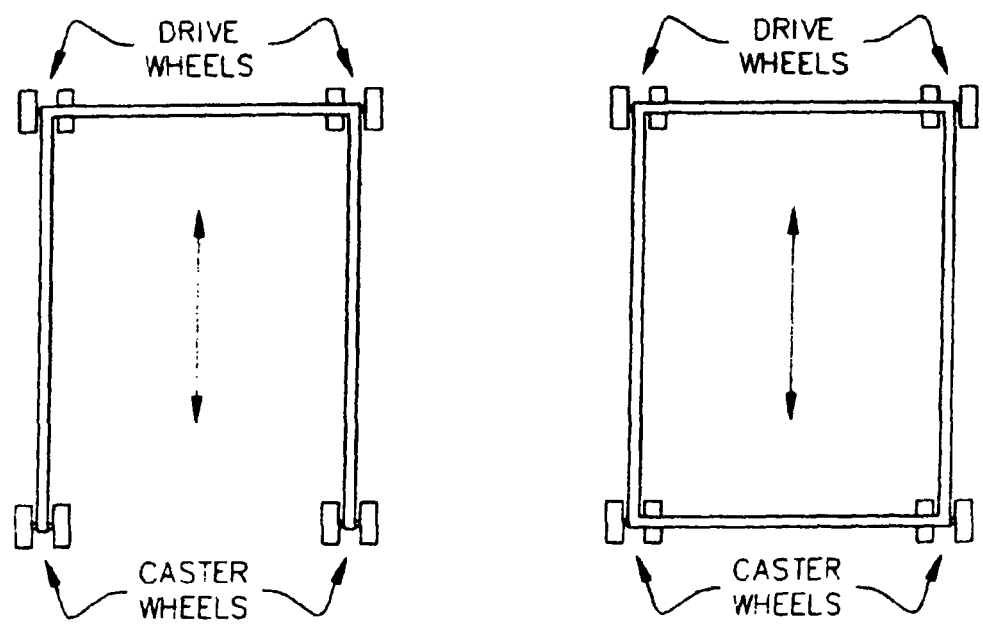

FIGS. 21A and 21B illustrate possible drive wheel and caster wheel configurations on 3 and 4 sided frames. Both drive wheels and caster wheels can be a single wheel assembly (as shown in FIG. 13) or a dual wheel single axle wheel assembly (as shown in FIGS. 15 and 16). Although the drive wheels and caster wheels are shown directly underneath the corners of the carrier frame, they can alternatively be located in proximity to the corners of the frame, as long as the carrier frame remains stable.

The configuration in FIG. 21B is the more common arrangement; however, the configuration in FIG. 21A is more suitable for maneuvering the frame into tight spaces, such as parallel parking spots. In such a configuration (FIG. 21A), drive wheels are located underneath the front-left and rear-left corners of the carrier frame. Such positioning aids in maneuvering the frame into tight spaces, such as parallel parking spaces. In an alternative embodiment, the drive wheels may be located underneath the front-right and rear-right corners of the carrier frame.

Figure 17A:
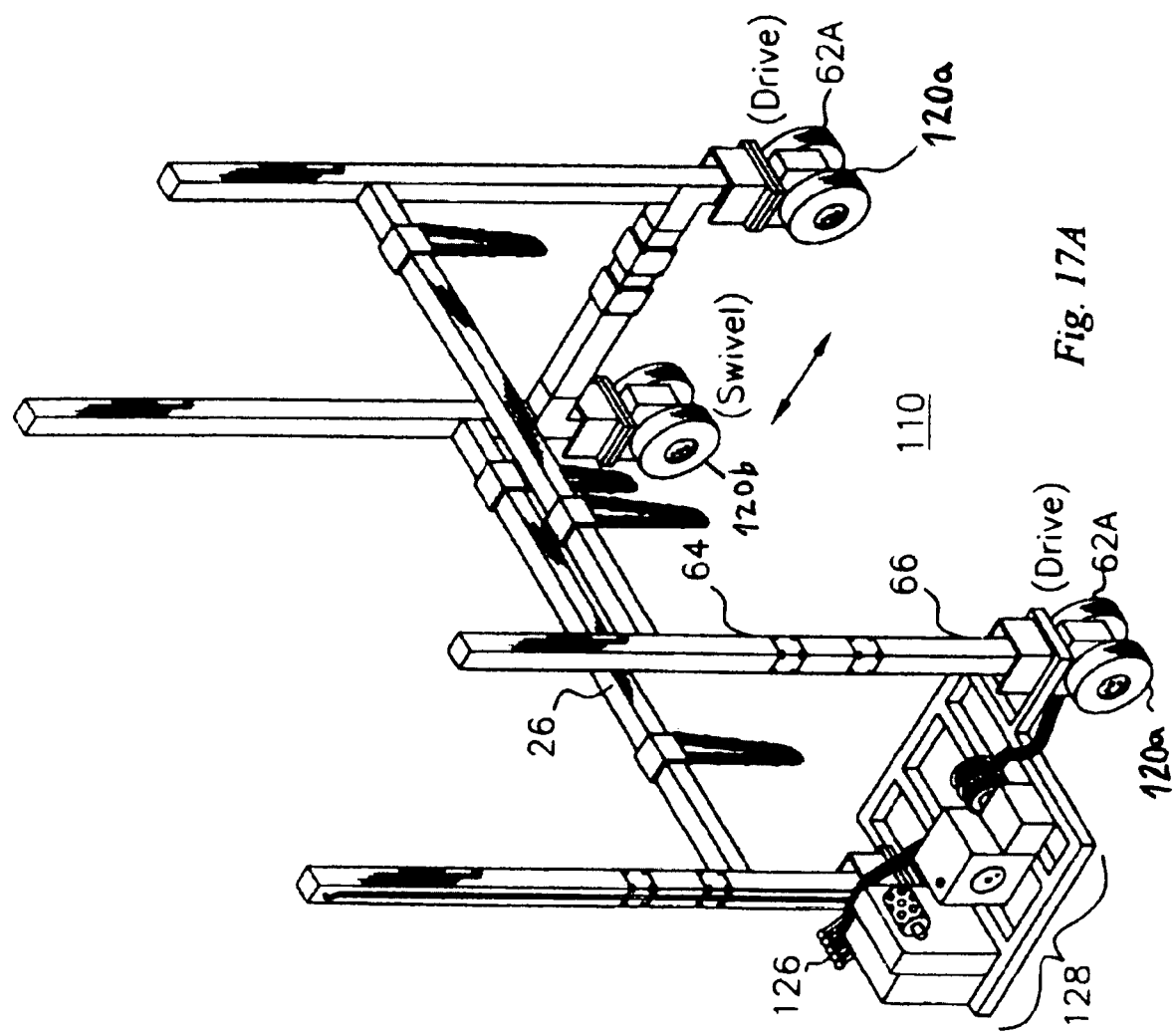
FIG. 17A is a depiction similar to FIG. 17, except modified to depict a carrier frame maneuverable into parallel parking spaces or similar tight locations.

In the configuration of FIG. 21A, the drive wheels preferably do not swivel, while the caster wheels swivel. The frame is preferably steered by applying power to one of the drive wheels while cutting power to the other drive wheel, or, in certain instances, driving one of the drive wheels forward while driving the other drive wheel backwards. FIG. 17A is similar to FIG. 17, except that it has been modified to depict a carrier frame maneuverable into parallel parking spaces or similar tight locations.

Figure 18A:
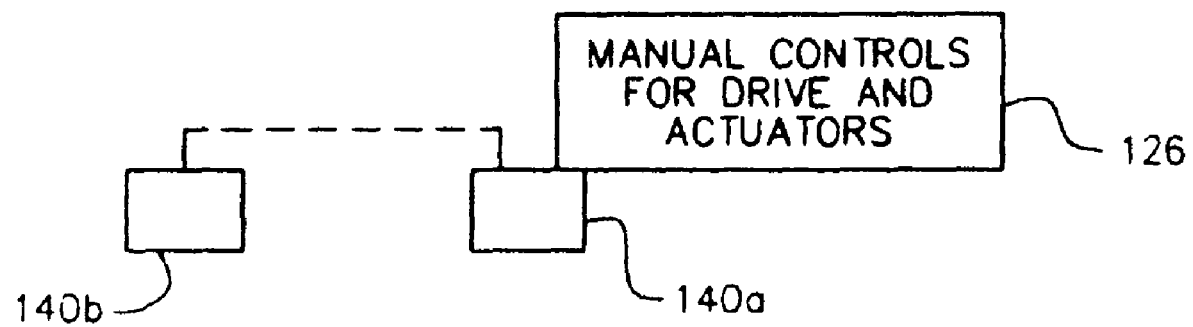
FIGS. 18A and 18B are schematic representations of examples of a remote control system for use in maneuvering the carrier frame.

The mobile carrier frame may also be remotely operated with a remote control device. As shown in FIG. 18A, hydraulic controls 126 depicted in FIGS. 17 and 17A, may be modified to include a remote control panel 140a, so that carrier frame 24 can be remotely operated by remote control device 140b, such as a radio-frequency device. Remote control device 140b may be adapted to communicate with hydraulic controls 126 through remote control panel 140a, and perform many functions normally performed using the manual hydraulic controls 126 or to perform only some preferred functions. An advantage of a remotely controlled carrier frame is that it allows an operator to look for obstructions as he or she walks around the mobile carrier frame while maneuvering the carrier frame, for instance into tights spaces, such as a parallel parking spot.

Figure 18B:
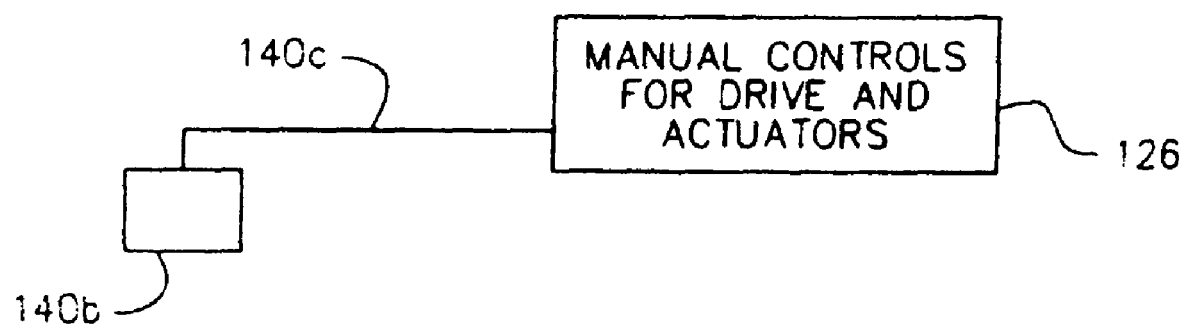
Figure 19A:
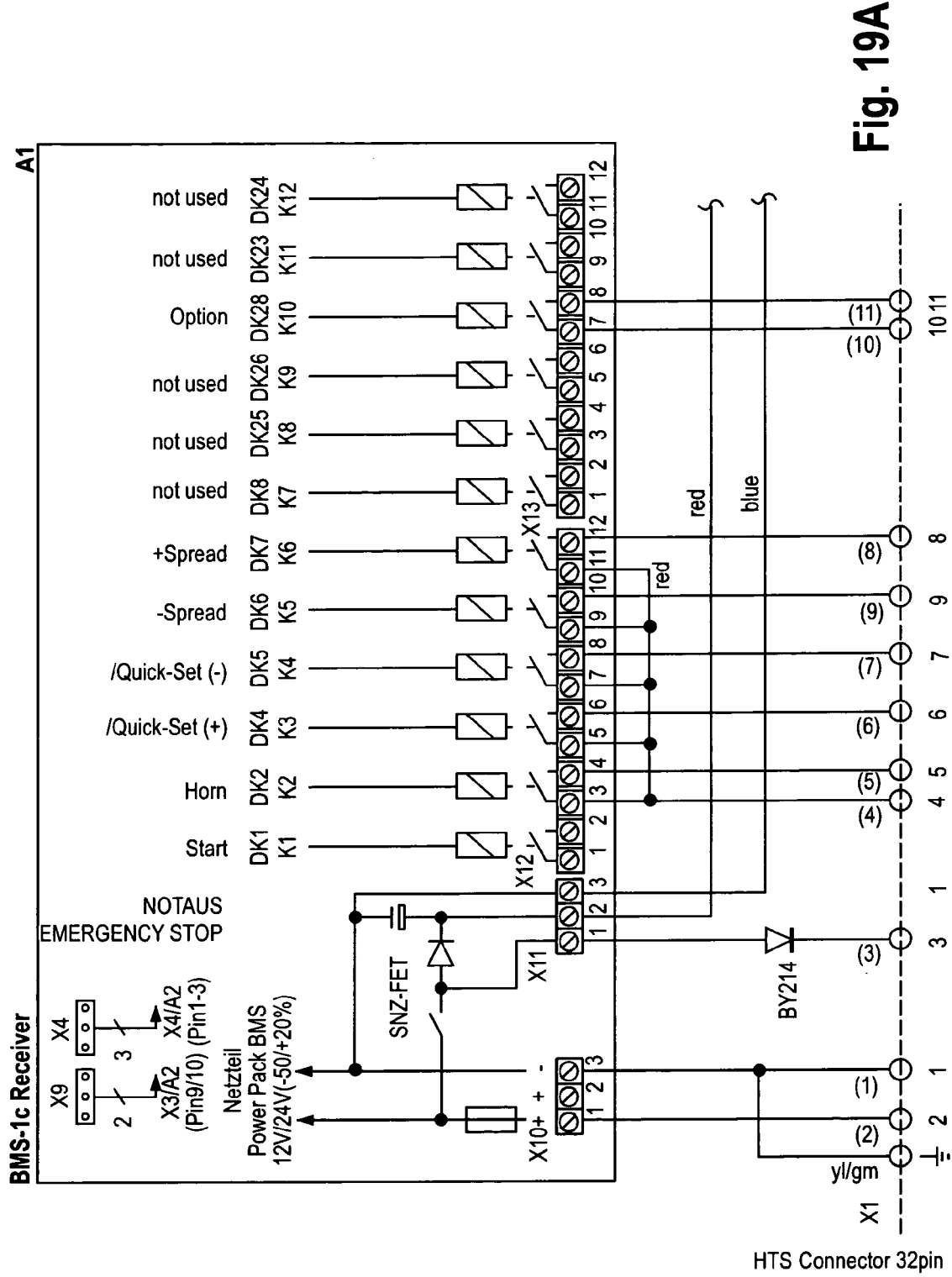
FIGS. 19A-19D show illustrative remote control schematics for a remote control designed and manufactured by Hetronic USA, Inc.
Figure 19B:
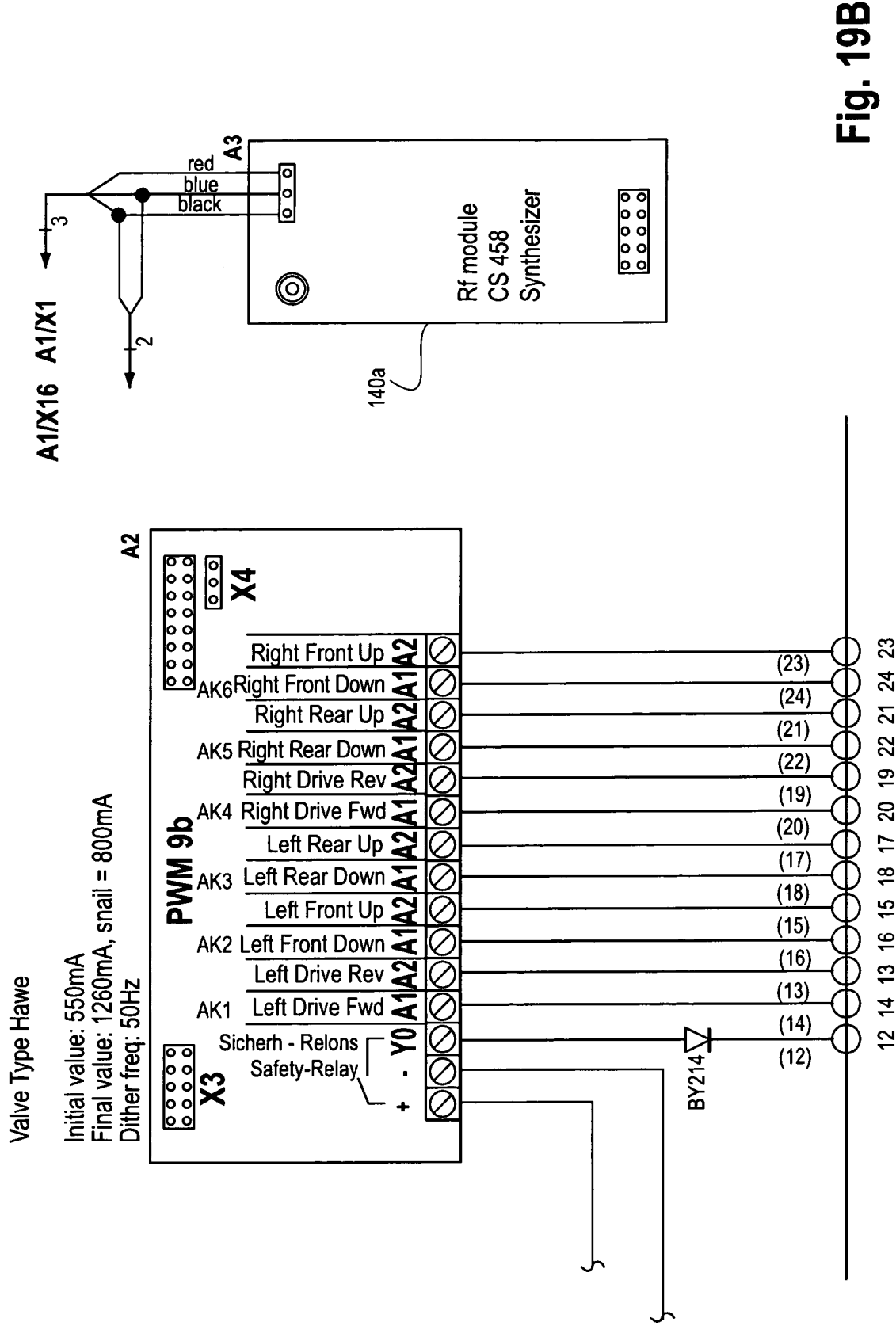
Figure 19C:
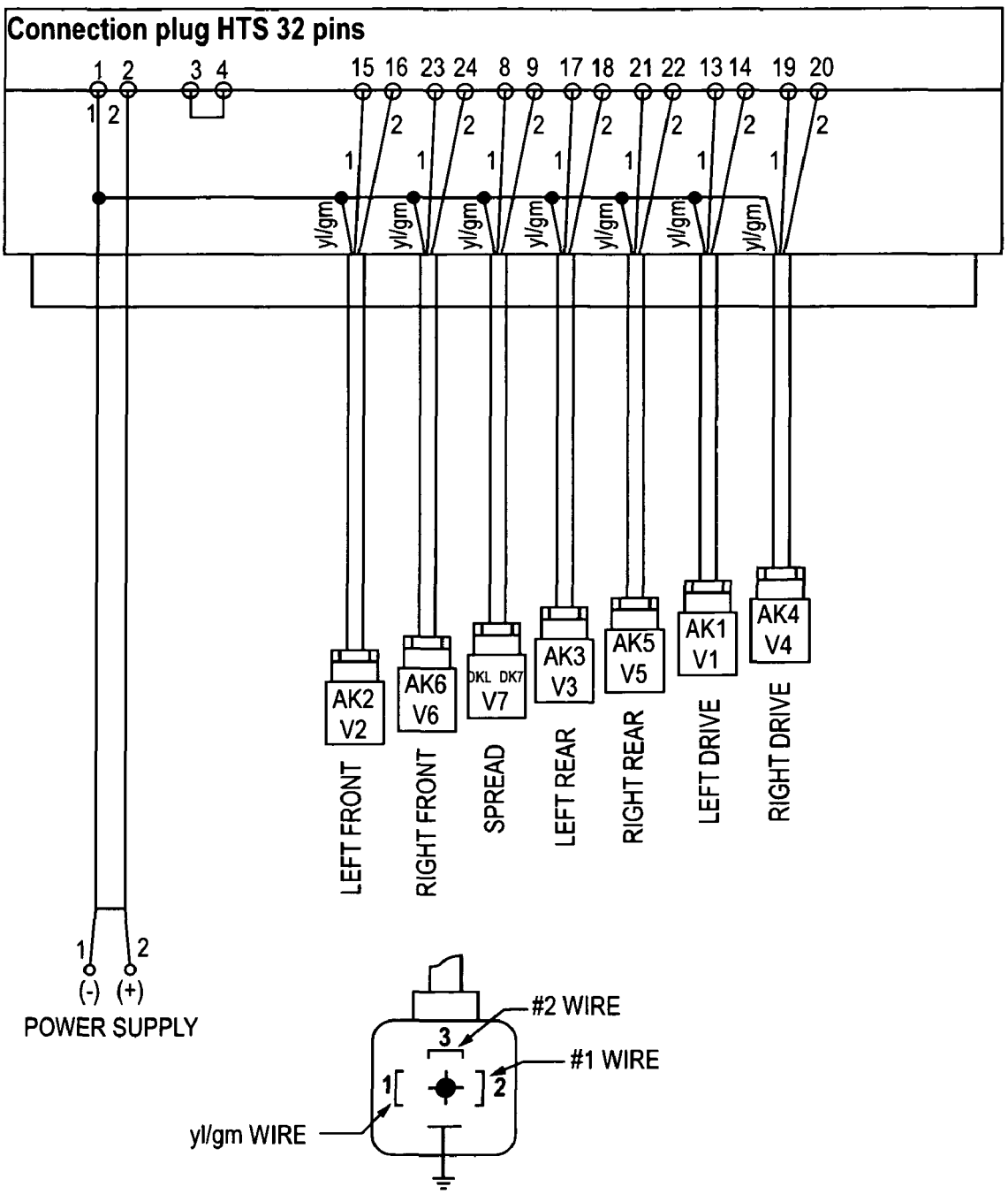
Figure 19D:
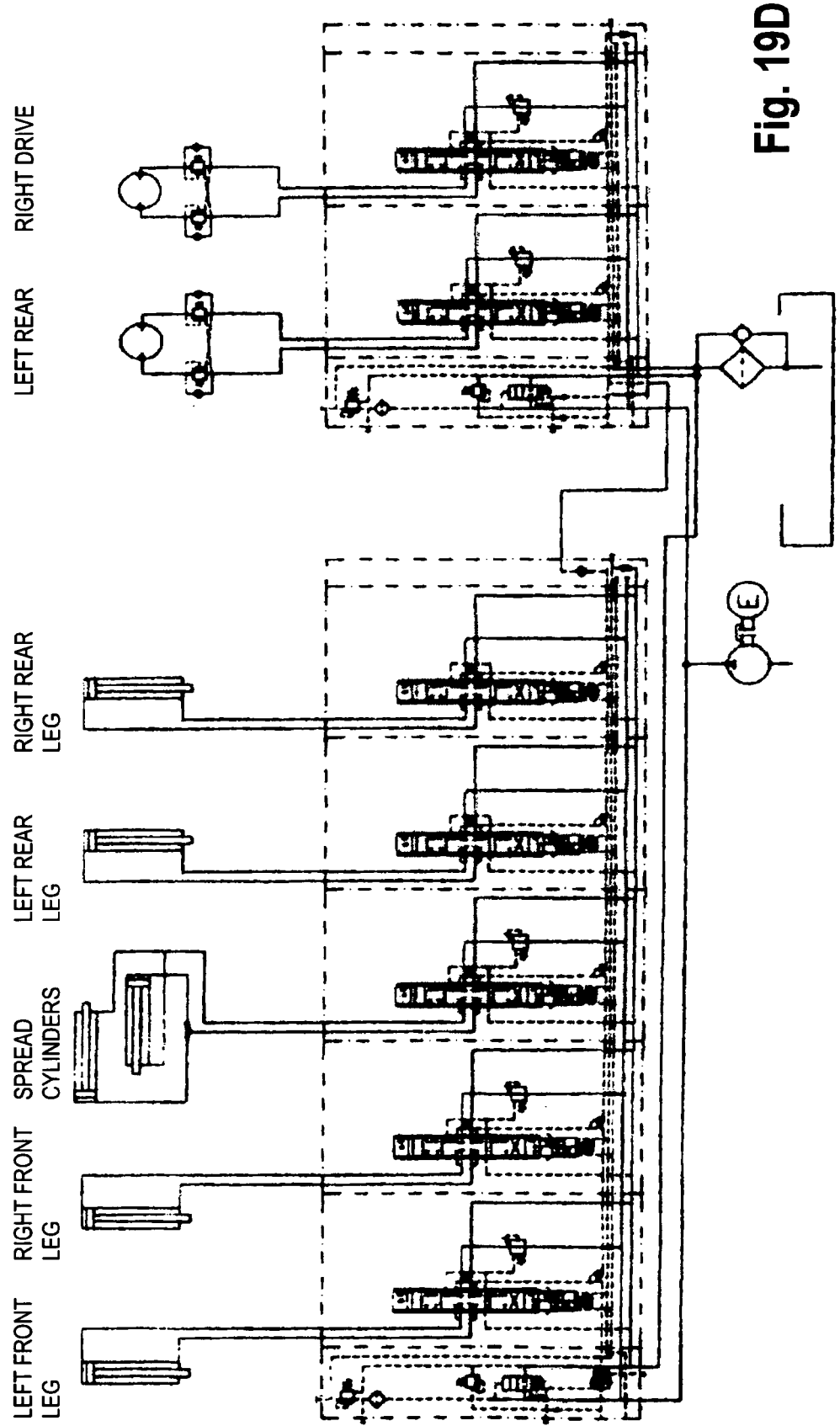

In an alternative embodiment, remote control device 140b may be hard wired or cabled to controls 126 via cable 140c (as illustrated in FIG. 18B). This is not a preferred embodiment as an operator will have to drag a relatively lengthy cable 140c. However, in an alternative embodiment, instead of dragging a cable, one or more sets of operational buttons may be provided at one or more locations on the carrier frame. Then, an operator may operate the apparatus from various locations around the carrier frame via cabled remote controls. This arrangement need not provide full functionality or all of the buttons/controls at each site. Instead, appropriate buttons/controls are provided. For instance, an operator on one side of the apparatus can observe and control the raising or lowering of a container. Similarly, an operator may be able to control the movement and steering of the apparatus with the use of buttons, for instance, in control panel 53 attached to an upright member in FIG. 22B.

Figure 20:
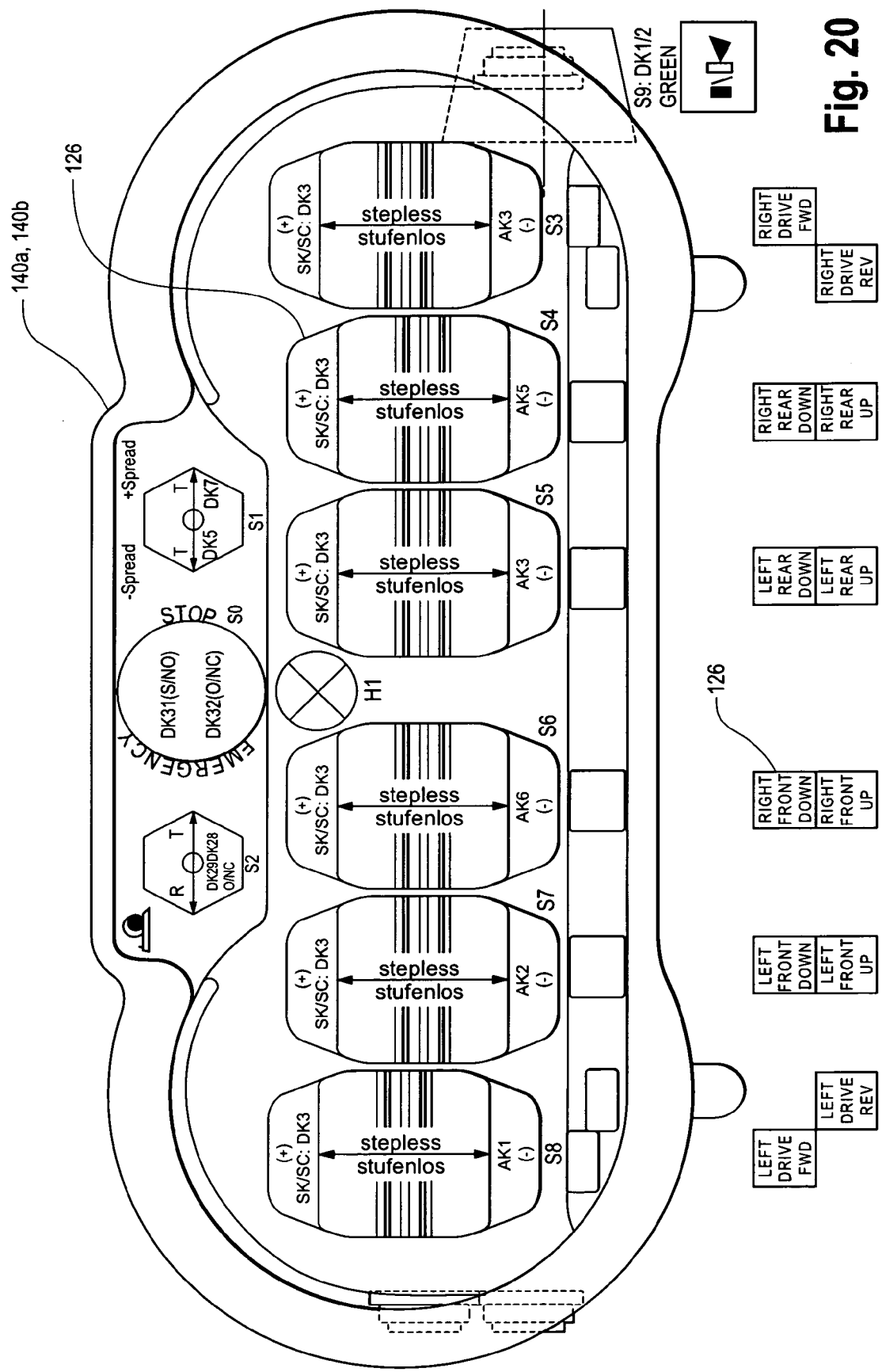
FIG. 20 is a schematic representation of an example of the controls on a remote control device and/or the direct mounted controls.
Figure 23:
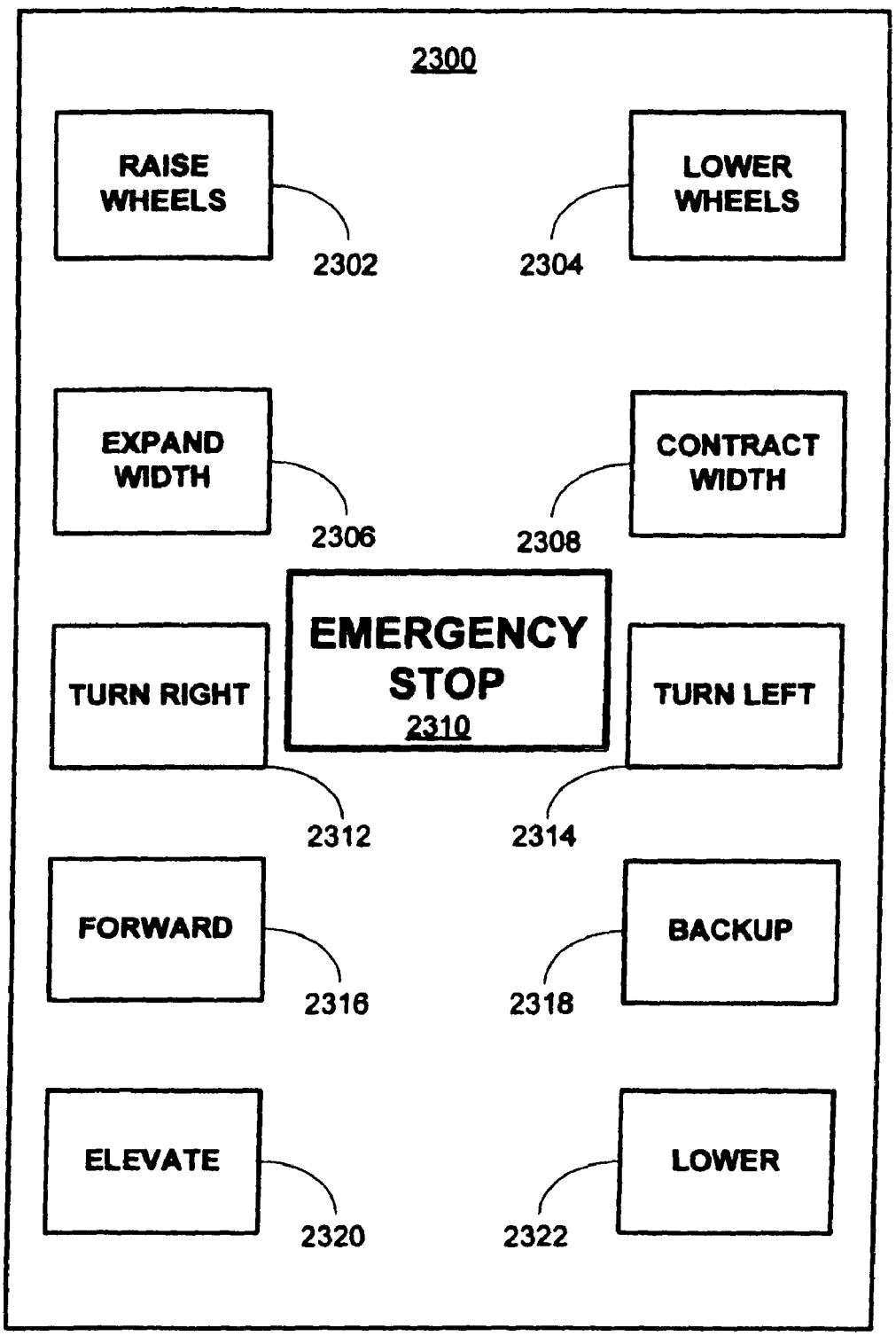
FIG. 23 illustrates an alternative remote control device arrangement.

FIGS. 19-20 and FIG. 23 show illustrative remote control schematics for a remote control designed and manufactured by Hetronic USA, Inc. FIG. 19A shows some functions available, e.g., "Start," "Horn," on a remote control in a preferred embodiment of the invention. FIGS. 19B through 19D show controls for detailed operation of the mobile carrier frame. The controls shown support operations such as "Left Drive Forward" to drive the left wheel assembly forward as well as its converse: "Left Drive Reverse." As is apparent, similar controls are possible for other drivable wheels. Other such paired operations include "Left Front Up" and "Left Front Down;" "Left Rear Up" and "Left Rear Down;" and their complementary operations for the right side. A suitable signal sent by the remote control device results in the indicated operation being carried out.

FIGS. 20 and 23 show illustrative arrangements of buttons 126 on remote control device 140a and buttons 2302 through 2322 on remote control device 2200. It is advantageous to implement the buttons or controls in the remote control device such that keeping a button pressed increases the both the duration and the speed at which a particular operation is carried out. This allows an operator both fine and coarse control. Accordingly, pressing a button to raise a container causes the container to be raised from a slow rate to an increasingly rapid rate if the button is kept pressed. Of course, the highest rate possible cannot be exceeded. Further, more than one button may be pressed to simultaneously cause two or more operations to be carried out. In another related aspect, the remote control device preferably includes an emergency stop button to provided additional safety.

The remote control device can also include security features to restrict its use to authorized users. For example, the transmissions between the remote control device and the mobile carrier frame are preferably encrypted. Each mobile carrier frame should respond to or be programmable to respond to only the intended remote control device. The security features, of course, include operation of the carrier frame only if the frame is properly operated, e.g., with the use of a key and/or codes.

Further, the remote control device is not limited to buttons. Other controls such as joystick-like levers or trackballs may be used. Some of these are better at indicating changes in a particular parameter rather than the absolute value of the parameter. As noted previously, controls need not be on wireless remotes only—they can be implemented in control box 53 affixed to the carrier frame in FIG. 22B, and other similar implementations.

It is to be understood that the above detailed description of embodiments of the invention is provided by way of example only. Various details of design and construction may be modified without departing from the true spirit and scope of the invention as set forth in the appended claims.

The invention claimed is:

1. A carrier frame for side-loading and handling a container, said carrier frame having a longitudinal axis, front and rear ends and right and left sides, comprising:
   a first longitudinal element connecting the front and rear end on the right side;
   a second longitudinal element connecting the front and rear end on the left side, wherein the first longitudinal element and the second longitudinal element are positioned substantially parallel to each other at different elevations along the longitudinal axis;
   at least one transverse element connected between the first and second longitudinal elements;
   a front-right wheel assembly underneath and in proximity to the front, right corner of the carrier frame;
   a front-left wheel assembly underneath and in proximity to the front, left corner of the carrier frame;
   a rear-right wheel assembly underneath and in proximity to the rear, right corner of the carrier frame; and
   a rear-left wheel assembly underneath and in proximity to the rear, left corner of the carrier frame;
   wherein one of the front-right wheel assembly and front-left wheel assembly comprises a drive mechanism and a non-swivel connection and one of the front-right wheel assembly and front-left wheel assembly comprises a swivel connection; and
   wherein one of the rear-right wheel assembly and rear-left wheel assembly comprises a drive mechanism and a non-swivel connection and one of the rear-right wheel assembly and rear-left wheel assembly comprises a swivel connection, such that the frame can be maneuvered into tight locations and the container can be loaded from the right or left side.

2. The carrier frame of claim 1, wherein each wheel assembly further comprises one or more wheels.

3. The carrier frame of claim 1, wherein at least one wheel assembly further comprises two wheels.

4. The carrier frame of claim 1, wherein the front-right wheel assembly and rear-right wheel assembly have respective drive mechanisms.

5. The carrier frame of claim 1, wherein the front-left wheel assembly and rear-left wheel assembly have respective drive mechanisms.

6. The carrier frame of claim 1, further comprising controls that control operation of the carrier frame.

7. The carrier frame of claim 6, further comprising a remote control panel that communicates with the controls of the carrier frame, wherein a remote control device communicates with the remote control panel for remote operation of the carrier frame.

8. The carrier frame of claim 6, wherein a remote control device is connected by a cable to the controls of the carrier frame for remote operation of the carrier frame.

9. The carrier frame of claim 1, further comprising at least two upright members at the rear end of the carrier frame, wherein one of the at least one transverse elements is connected between the two upright members.

* * * * *